United States Patent [19]

Yamaura et al.

[11] Patent Number: 5,594,890
[45] Date of Patent: Jan. 14, 1997

[54] EMULATION SYSTEM FOR EMULATING CPU CORE, CPU CORE WITH PROVISION FOR EMULATION AND ASIC HAVING THE CPU CORE

[75] Inventors: Shinichi Yamaura, Kobe; Keiichi Yoshioka, Sanda; Kazuhiko Hara; Takao Katayama, both of Ikeda, all of Japan

[73] Assignee: Ricoh Company, Ltd., Tokyo, Japan

[21] Appl. No.: 200,705

[22] Filed: Feb. 23, 1994

[30] Foreign Application Priority Data

Feb. 25, 1993  [JP]  Japan .................... 5-036591

[51] Int. Cl.$^6$ ........................... G06F 17/00
[52] U.S. Cl. .............. 395/500; 364/578; 371/22.5; 371/22.6
[58] Field of Search ............... 395/500, 200.12; 364/578, 579; 371/11.1, 16.2, 22.2, 22.6, 22.5

[56] References Cited

U.S. PATENT DOCUMENTS

| | | | |
|---|---|---|---|
| 4,901,259 | 2/1990 | Watkins | 364/578 |
| 4,939,637 | 7/1990 | Pawloski | 364/200 |
| 5,053,949 | 10/1991 | Allison et al. | 364/200 |
| 5,056,013 | 10/1991 | Yamamoto | 364/200 |
| 5,058,114 | 10/1991 | Kuboki et al. | 371/19 |
| 5,329,471 | 7/1994 | Swoboda et al. | 364/578 |
| 5,339,262 | 8/1994 | Rostoker et al. | 364/578 |
| 5,371,878 | 12/1994 | Coker | 395/500 |
| 5,418,976 | 5/1995 | Iida | 395/800 |
| 5,430,862 | 7/1995 | Smith et al. | 395/500 |
| 5,434,804 | 7/1995 | Bock et al. | 364/579 |
| 5,463,738 | 10/1995 | Matsuishi et al. | 395/825 |

OTHER PUBLICATIONS

Freeman, "Emulating Peripheral Chips Using a RISC Core", IEEE 1990, pp. 420–426.
Lee et al., "The Motorola 16-Bit DSP ASIC Core", IEEE 1990, pp. 973–976.
Pasternak et al., "In-Circuit-Emulation in ASIC Architectural Core Designs", IEEE 1989, pp. P6.4.1–P6.4.4.

*Primary Examiner*—Kevin J. Teska
*Assistant Examiner*—Tan Nguyen
*Attorney, Agent, or Firm*—Woodcock Washburn Kurtz Mackiewicz & Norris

[57] ABSTRACT

An IC is provided with a CPU core selected from a plurality of CPU cores, each of which has a specific function. Each CPU core has a system-bus terminal and a common emulator connecting-exclusive terminal. The IC is also provided with a predetermined function device connected to a system bus of the selected CPU core. An emulation bus connects an emulator to the selected CPU core via the common emulator connecting-exclusive terminal. An emulator performs emulation on the selected CPU core which is connected via the emulation bus when the selected CPU core is in a monitor mode. The number of terminal elements and the function associated with each terminal element of the common emulator connecting-exclusive terminal are identical among the common emulator connecting-exclusive terminals.

34 Claims, 28 Drawing Sheets

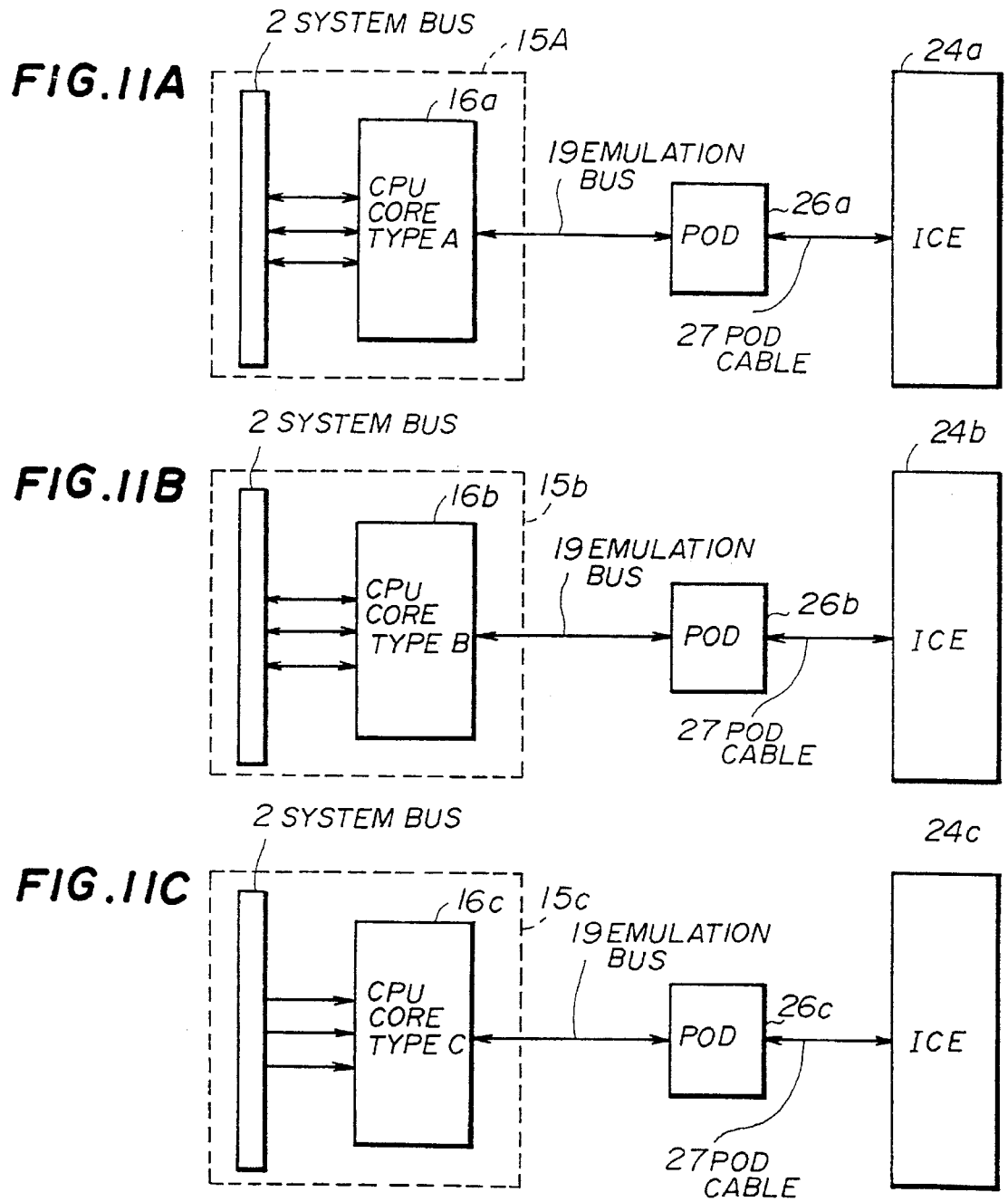

| ST2 | ST1 | ST0 | PROCESSOR STATE |
|---|---|---|---|
| 0 | 0 | 0 | NORMAL |
| 0 | 0 | 1 | RESERVED |
| 0 | 1 | 0 | VECTOR FETCH |
| 0 | 1 | 1 | VECTOR ACKNOWLEDGE |
| 1 | 0 | 0 | MEMORY LOCK |
| 1 | 0 | 1 | SLEEP (LOW POWER CONSUMPTION STATE) |
| 1 | 1 | 0 | CODE FETCH AFTER BRANCH |
| 1 | 1 | 1 | HOLD |

FIG. 24

INTERRUPT SELECTION

| INTERRUPT LEVEL | INTERRUPT REQUEST SIGNAL | | | | SORT |
|---|---|---|---|---|---|
| | INT 3 | INT 2 | INT 1 | INT 0 | |
| 0 (HIGH) | 0 | 0 | 0 | 0 | IRQ 0 |
| 1 | 0 | 0 | 0 | 1 | IRQ 1 |
| 2 | 0 | 0 | 1 | 0 | IRQ 2 |
| 3 | 0 | 0 | 1 | 1 | IRQ 3 |
| 4 | 0 | 1 | 0 | 0 | IRQ 4 |
| 5 | 0 | 1 | 0 | 1 | IRQ 5 |
| 6 | 0 | 1 | 1 | 0 | IRQ 6 |
| 7 | 0 | 1 | 1 | 1 | IRQ 7 |
| 8 | 1 | 0 | 0 | 0 | IRQ 8 |
| 9 | 1 | 0 | 0 | 1 | IRQ 9 |
| 10 | 1 | 0 | 1 | 0 | IRQ 10 |
| 11 | 1 | 0 | 1 | 1 | IRQ 11 |
| 12 | 1 | 1 | 0 | 0 | IRQ 12 |
| 13 | 1 | 1 | 0 | 1 | IRQ 13 |
| 14 (LOW) | 1 | 1 | 1 | 0 | IRQ 14 |
| — | 1 | 1 | 1 | 1 | NO INTERRUPT |

FIG. 25
EMULATOR INTERFACE LIST

| TERMINAL ELEMENT | ATTRIBUTE | TEMINAL-ELEMENT NAME | ACTIVE | 3 STATE |
|---|---|---|---|---|
| EAD0-7 | I/O | ADDRESS/DATA BUS | H/L | Y |
| EA8ST0 | OUT | ADDRESS8/STATUS LODE 0 | H/L | - |
| EA9ST1 | OUT | ADDRESS9/STATUS LODE 1 | H/L | - |
| EA10ST2 | OUT | ADDRESS10/STATUS LODE 2 | H/L | - |
| EA11EM | OUT | ADDRESS11/EMULATION MODE | H/L | - |
| EA12DA | I/O | ADDRESS12/DATA ACKNOWLEDGE | H/L | Y |
| EA13DD | I/O | ADDRESS13/DISABLE DATA ACKNOWLEDGE | H/L | Y |
| EA14JM | I/O | ADDRESS14/DATA JAMMING | H/L | Y |
| EA15DI | I/O | ADDRESS15/DISABLE INTERRUPT REQUEST | H/L | Y |
| EAD8-15 | I/O | ADDRESS/DATA BUS | H/L | Y |
| ERWB | OUT | READ/WRITE | H/L | - |
| ESIZE | OUT | TRANSFER DATA SIZE/SIZE ACKNOWLEDGE | H/L | - |
| EBAB | OUT | BUS ACKNOWLEDGE | L | - |
| EDBRQ | IN | DISABLE BUS REQUEST | L | - |
| EBSB | OUT | BUS START | L | - |
| EDSB | OUT | DATA STROBE | L | - |
| ECLKO | OUT | CLOCK OUT | H/L | - |
| ERESO | OUT | RESET OUT | L | - |
| EBKO-1 | IN | EMULATER BREAK | L | - |
| EPDMO | I/O | PROGRAM/DATA. MONITOR MODE | H/L | Y |
| ELVM1 | I/O | LEVEL/MONITOR MODE | H/L | Y |

FIG. 26

MONITOR MODE

| ELVM1 | EPDM0 | MODE |
|---|---|---|
| 1 | 1 | NORMAL |
| 1 | 0 | MONITOR 3 |
| 0 | 1 | MONITOR 2 |
| 0 | 0 | MONITOR 1 |

FIG.27

EXCEPTION PROCESSING LIST

| EXCEPTION PROCESSING REQUEST | KIND | Vec Num (NOTE 1) (HEXADECIMAL) | FORMAT (NOTE 2) | PROCESSING IN PROGRESS (NOTE 3) | LOCATION ON MEMORY (HEXADECIMAL) |
|---|---|---|---|---|---|
| HARDWARE | RESET | 00 | NO | ABORT | 00 |
| HARDWARE | EMULATOR NMI 1 | 04 | 0 | COMPLETE | 10 |
| HARDWARE | EMULATOR NMI 2 | 05 | 0 | COMPLETE | 14 |
| SOFTWARE | EMULATOR BREAK | 06 | 0 | COMPLETE | 18 |

NOTE 1 : VECTOR NUMBER

NOTE 2 : STACK FRAME FORMAT NUMBER

NOTE 3 : INSTRUCTION RETRY IS IMPOSSIBLE IN ABORT SINCE PROGRAM EXECUTION HAS BEEN ABORTED. COMPLETE MEANS EXCEPTION PROCESSING IS STARTED AFTER COMPLETION OF CURRET INSTRUCTION EXECUTION.

FIG. 28

EMULATOR BREAK

| EBKI | EBK0 | KIND OF BREAK |
|---|---|---|
| 0 | 0 | RESET |
| 0 | 1 | EMULATOR NMI 2 |
| 1 | 0 | EMULATOR NMI 1 |
| 1 | 1 | NORMAL |

FIG. 29

| CPU CORE KIND | TYPE A | TYPE B | TYPE C |
|---|---|---|---|
| NUMBER OF INSTRUCTIONS | 100 | 200 | 300 |
| HARDWARE INTERRUPT | 1 | 4 | 8 |
| OPERATION WIDTH | 8 BITS | 16 BITS | 32 BITS |
| DATA BUS WIDTH | 8 BITS | 16 BITS | 16 BITS |
| ADDRESS BUS WIDTH | 16 BITS | 24 BITS | 24 BITS |
| BUS ARCHITECTURE | SYNCHRONOUS BUS | SYNCHRONOUS BUS | ASYNCHRONOUS BUS |

EMULATION SYSTEM FOR EMULATING CPU CORE, CPU CORE WITH PROVISION FOR EMULATION AND ASIC HAVING THE CPU CORE

BACKGROUND OF THE INVENTION

1. Field of the Invention

The present invention relates to an emulation system for performing emulation operations on a core-type central processing unit (CPU) provided in an integrated circuit (IC). In the CPU construction of a core type, the CPU is integrated on the silicon substrate together with peripheral circuits. Such a CPU construction will be referred to as a CPU core, hereinafter. A core CPU is in contrast to a standalone CPU chip, which does not have other devices provided on the IC substrate in addition to the CPU core. The present invention also relates to an application-specific integrated circuit (abbreviated ASIC, hereinafter) provided with a CPU core such as mentioned above.

2. Related Art

With reference to FIG. 1, a general construction of a system comprising a CPU core such as described above will be described. An IC 3 including the CPU core 1 has a system bus 2 therein. The terminals associated with the CPU core 1 are connected to the system bus 2. Other circuit devices are also provided in the IC 3 and are connected to the system bus 2. Thus, the other circuit devices are connected to the CPU core 1 via the system bus 2. The IC 3 performs a predetermined operation where data is transferred via the system bus 2 between the CPU core 1 and the other circuit devices connected to the system bus 2. In order to perform data transfer between the CPU core 1 and an external device, an interface is provided between the external device and the system bus 2 or any of the other internal circuit devices.

A case will be described where the entirety of the system formed on an IC such as the IC 3 or a system in which the IC 3 is provided as a part of the relevant system is under development. In such a case, the relevant system will undergo operation analysis, debugging, operation verification, and so on. For this purpose, emulation using an in-circuit emulator (abbreviated ICE, hereinafter) is commonly used.

With reference to FIG. 2, an emulation system using such an ICE will be described. The same reference numerals are given to elements identical to those in the construction of FIG. 1.

An ICE 5 is provided external to an IC 4 comprising the CPU core 1. The ICE 5 comprises an emulator element 6, a pod 7 and a pod cable 8 connecting the emulator element 6 with the pod 7. In the pod 7, an emulation chip 9 is provided which performs operation identical to that in the CPU core 1. The emulation chip 9, through an emulation controller 11, is connected to a bus 10 including bus elements corresponding to all terminals which the CPU core has. The emulation chip controller 11 operates to monitor or alter input signals and output signals associated with the emulation chip 9. The emulator element 6 controls, via the pod cable 8, the entirety of this operation.

In the IC 4, a bus switch 12 is provided between the CPU core 1 and system bus 2. The bus switch 12 connects, in the normal operation state, the CPU core 1 with the system bus 2. The bus switch 12 connects, in the emulation operation state, the CPU bus 10 with the system bus 2, the CPU core 1 being deactivated. Accordingly, in the emulation operation state, the emulation chip 9 is connected to the system bus 2 via the CPU bus 10 and the CPU core 1 is not connected thereto. Thus, the system formed on the IC 4 or the system including the IC 4 is operated under the condition where the emulation chip 9 is substituting for the CPU core 1 as the CPU in the relevant system.

Then, the emulator element 6, via the pod cable 8, performs monitoring, resetting, interruption, and other control of the operation in the emulation chip. Thus, system-operation analysis, debugging and verification are performed on the relevant system, to achieve the initial object as mentioned above.

Thus, in a construction such as described above, the bus connecting the CPU core 1 with the system bus 2, both being integrated in the IC 4, is required to be externally accessible, so as to form the CPU bus 10, from the IC 4 by means of the bus switch 12. As described above, in order to implement the emulation to be performed on the CPU core 1, the emulation chip 9 is required which acts identically to the CPU core 1. Accordingly, it is necessary that the CPU bus 10 comprises all signal lines which are to be connected to all terminals provided on the CPU core 1. Thus, it is necessary that the terminals are provided on the IC 4 comprising the CPU core 1 for the purpose of the emulation, which terminals are not necessary in the non-emulation mode. Thus an increased number of terminal elements need to be provided on the IC 4. The increased number of terminal elements remarkably raises the cost of the IC.

Further, the emulation chip 9 acts instead of the CPU core 1 in the emulation-operation state as described above. The bus switch 12 and the CPU bus 10 lie between the emulation chip 9 and the system bus 2. As a result, a time lag may occur in the signal transfer between the emulation chip 9 and the system bus 2 in comparison to the normal operation mode in which the IC 4 is operated by the CPU core 1. Thus, differences between the two modes may occur. That is, there may be a case where although there occurs no trouble in the normal operation mode in which the CPU core 1 operates the IC 4, incorrect operation occurs due a time lag such as mentioned above in the emulation mode where the emulation chip 9 operates the IC 4.

Further, in a construction such as that comprising a provision such as the bus switch 12, another problem occurs in each development stage of a system such as the IC 4 comprising the CPU core 1. The problem is that, it is necessary to develop, for each CPU architecture, components such as the emulation chip 9 having the same performance as the relevant CPU core 1, and the pod 7 comprising the emulation chip 9. Thus, an increased cost and an lengthy period are required for the development, due to the increased number of components to be developed.

SUMMARY OF THE INVENTION

An object of the present invention is to provide an emulation system, emulator, CPU core, and ASIC using the CPU core, in which cost is reduced, and there is no difference in the operations between the mode in which an emulator is used and a mode in which an emulator has not yet been used. Thus, development of any extra components for each CPU architecture is not needed.

To achieve the above object of the present invention, an emulation system according to the present invention comprises:

an IC provided with a CPU core arbitrarily selected from among a plurality of different-specification CPU cores, each core of said plurality of different-specification CPU cores having a system-bus terminal and a common emulator connecting-exclusive terminal, said IC being also provided with a predetermined function means connected to a system bus associated with the selected CPU core;

an emulation bus connectable to the common emulator connecting-exclusive terminal of said selected CPU core; and emulator means for performing emulation of said selected CPU core connected to said emulation bus.

Further, the common emulator connecting-exclusive terminal is that such that:

the common emulator connecting-exclusive terminal provided on said selected CPU core is used in a monitor mode concerning said selected CPU core;

the number of terminal elements and the function associated with each terminal element of the common emulator connecting-exclusive terminal are the same among all of said plurality of different specification CPU cores; and the common emulator connecting-exclusive terminal is connected to said emulation bus.

Thus, the common emulation connecting-exclusive terminal provided on each CPU core is the same for all the cores among the plurality of different-specification CPU cores, with respect to the number of terminal elements and the functions associated with the respective terminal elements. Accordingly, the emulation bus is made to be connectable with the common emulation connecting-exclusive terminal associated with any of the different-specification CPU cores provided in an IC(s). Accordingly, it becomes possible to connect the emulator means directly to any CPU core among the different-specification CPU cores via the common emulation bus. Therefore, the common emulator connecting-exclusive terminal and emulation bus provided on each CPU core such as described above enables a single emulator to be sufficient in emulation to be performed for any CPU core among the different-specification CPU cores.

Other objects and further features of the present invention will become more apparent from the following detailed description when read in conjunction with the accompanying drawings.

BRIEF DESCRIPTION OF THE DRAWINGS

FIGS. 11A, 11B and 11C illustrate the capability of any of the CPU cores shown in FIGS. 10A, 10B and 10C to be connected to a common ICE via a pod cable;

FIG. 23 shows a relationship between data associated with three-state output signals ST0-2 and states in a CPU core;

FIG. 24 shows a relationship between an input signal provided to four terminal elements INT0-3 and relevant interrupt levels;

FIG. 25 shows an interface list concerning an emulator connecting-exclusive terminal;

FIG. 26 shows four monitor modes;

FIG. 27 shows four kinds of exception processing;

FIG. 28 illustrates signal combination to be used for determining above four kinds of exception processing shown in FIG. 27; and FIG. 29 shows respective specifications associated with CPU cores of three different architectures shown in FIGS. 10A–10C.

DESCRIPTION OF PREFERRED EMBODIMENTS

Figure 3:
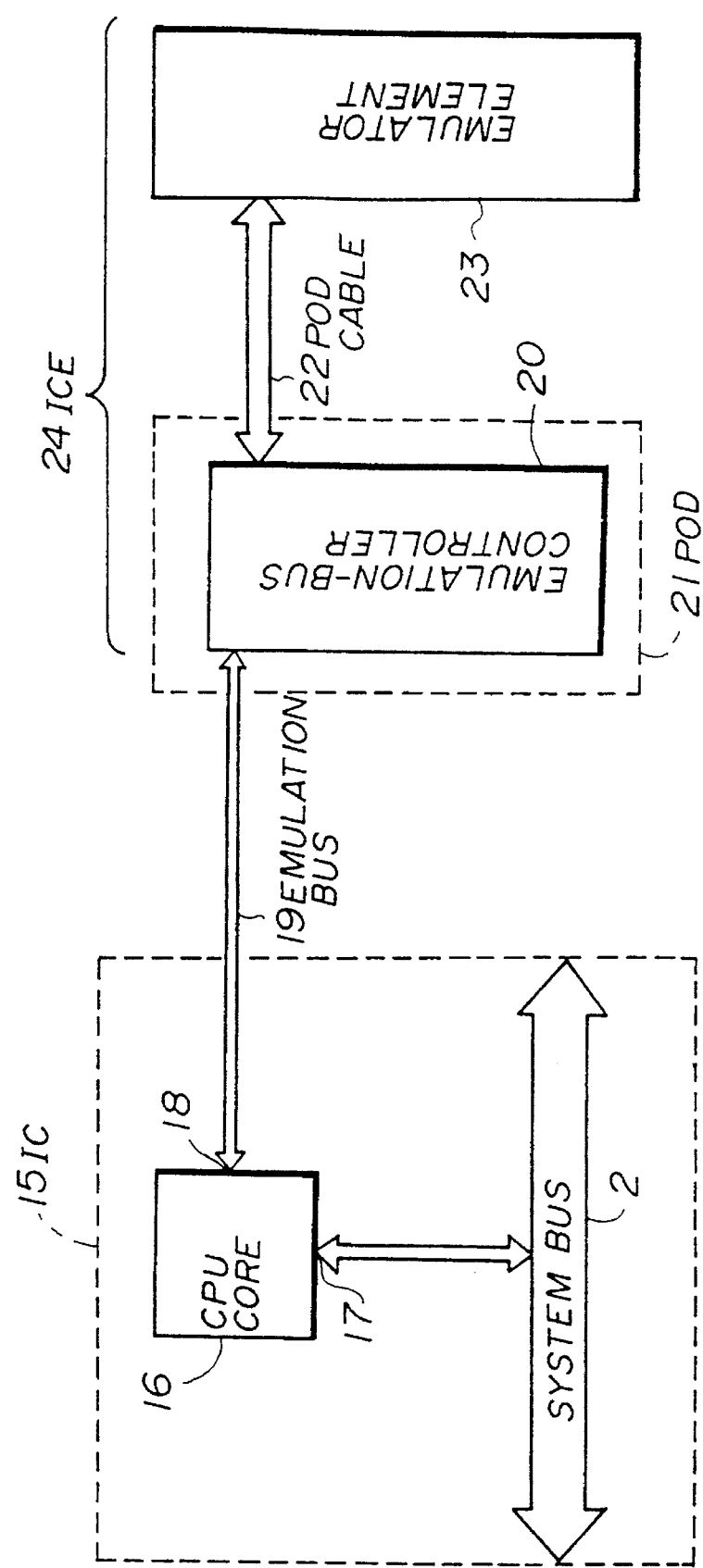
FIG. 3 shows a block diagram of a construction example of an emulation system according to the present invention.

FIG. 3 shows a general example of an entire system including an IC having a CPU core according to the present invention. The entire system will be generally described with reference to FIG. 3. In the following description, a mode where a CPU core 16 communicates data via a system bus 2 will be referred to as a normal mode, and a mode where the CPU core 16 communicates data via an emulation bus 19 will be referred to as a monitor mode.

Figure 1:
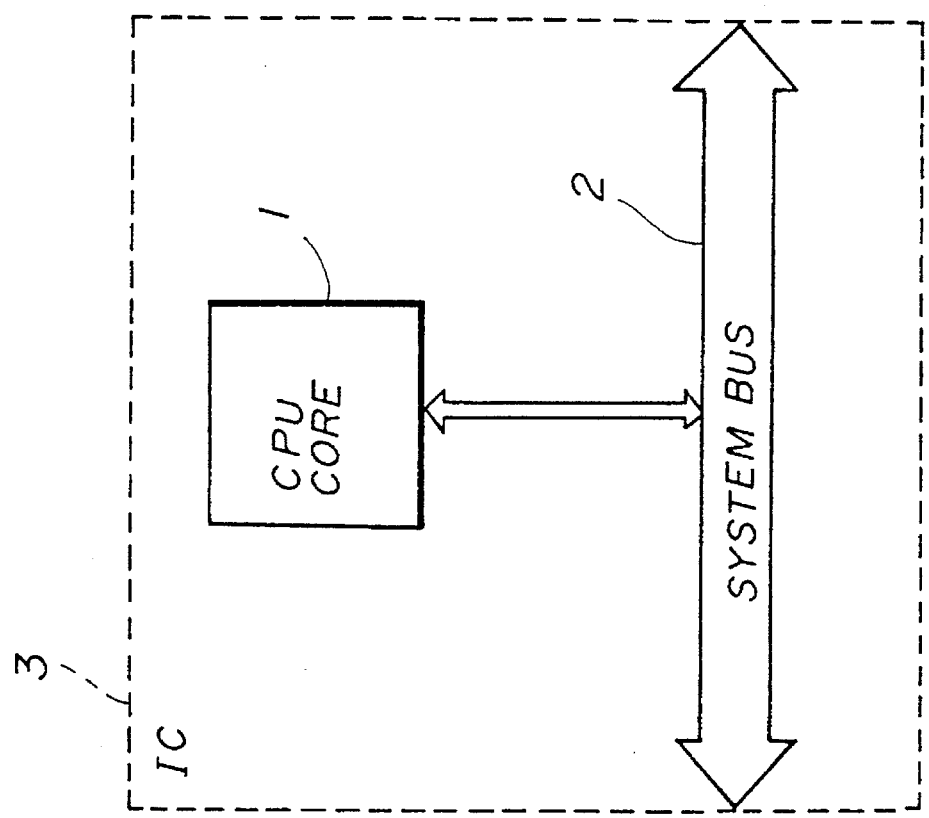
FIG. 1 shows a block diagram of an IC having a CPU core in the related art.

An IC 15 including the CPU core 16 in one example of a CPU core according to the present invention has the system bus 2. A system-bus terminal 17 on the CPU core 16 is connected to the system bus 2. Such a construction is identical to that in FIG. 1.

The above system-bus connecting terminal 17 is a terminal for signals which are input into/output from the CPU core 16 so that the IC 15 appropriately functions. Further, the CPU core 16 in the embodiment is provided with, in addition to the above system-bus terminal 17, an emulator connecting-exclusive terminal 18 which connects, via an emulation bus 19, the CPU core 16 to an emulator element 23. In the monitor mode, the emulator element 23 is connected to the CPU core 16 via the emulation bus 19, a pod 21 and a pod cable 22, the emulator element 23 thus controlling and communicating data with the CPU core 16. In non-monitor mode, the CPU core 16 does not use the emulator connecting-exclusive terminal 18 and communicates data only with the system bus 2 via the system-bus terminal 17 similarly to the case of FIG. 1, thus performing predetermined operations associated with the IC 15. In the following description, various devices connected to the system bus will be generically referred to as the system side and devices provided in the emulator element 23 will be generically referred to as the emulator side.

The entire system has been described above and one embodiment of a CPU core according to the present invention will be described with reference to figures such as FIG. 5.

The above described system-bus terminal 17 will be described which is used for the CPU core 16 to act as a CPU.

<TERMINAL ELEMENTS RELATING TO DATA BUS>

D0–15 (Data Bus): Data Bus Input/Output Terminal Elements (in FIG. 5)

These 16-bit three-state bus-input/output terminal elements are for inputting data from/outputting data to the data bus. CPU core 16 (may be referred to as the processor, hereinafter), via these terminal elements, fetches program instructions and transfers data by means of the data-bus input/output signals.

Figure 6:
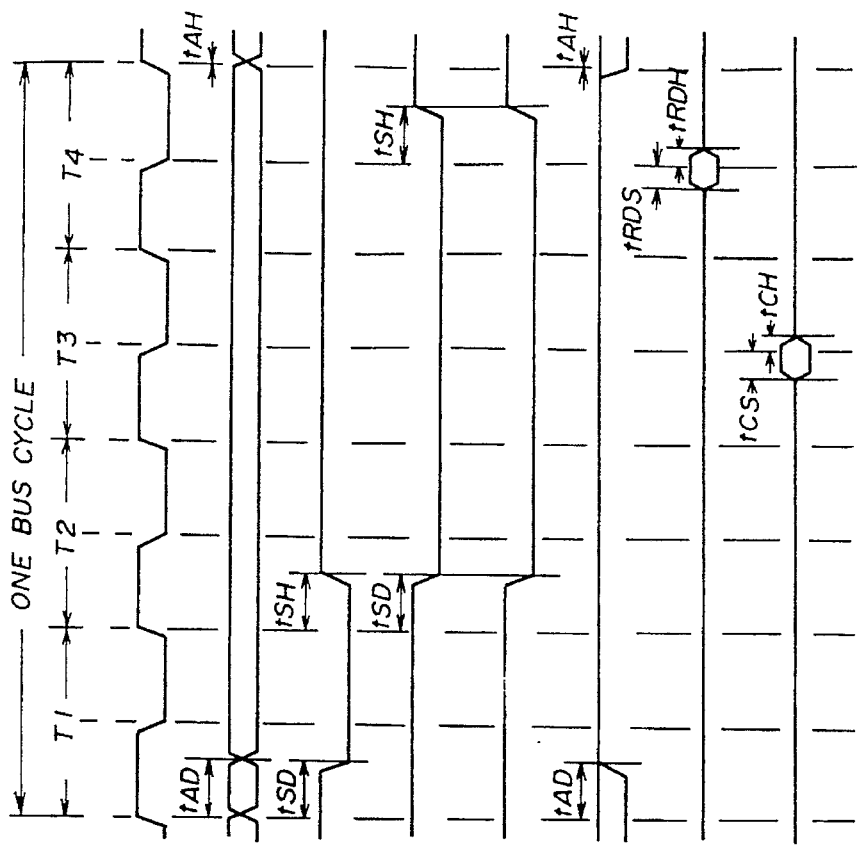
FIGS. 6A–6H show timing charts for read timing associated with a CPU core according to the present invention.
Figure 7:
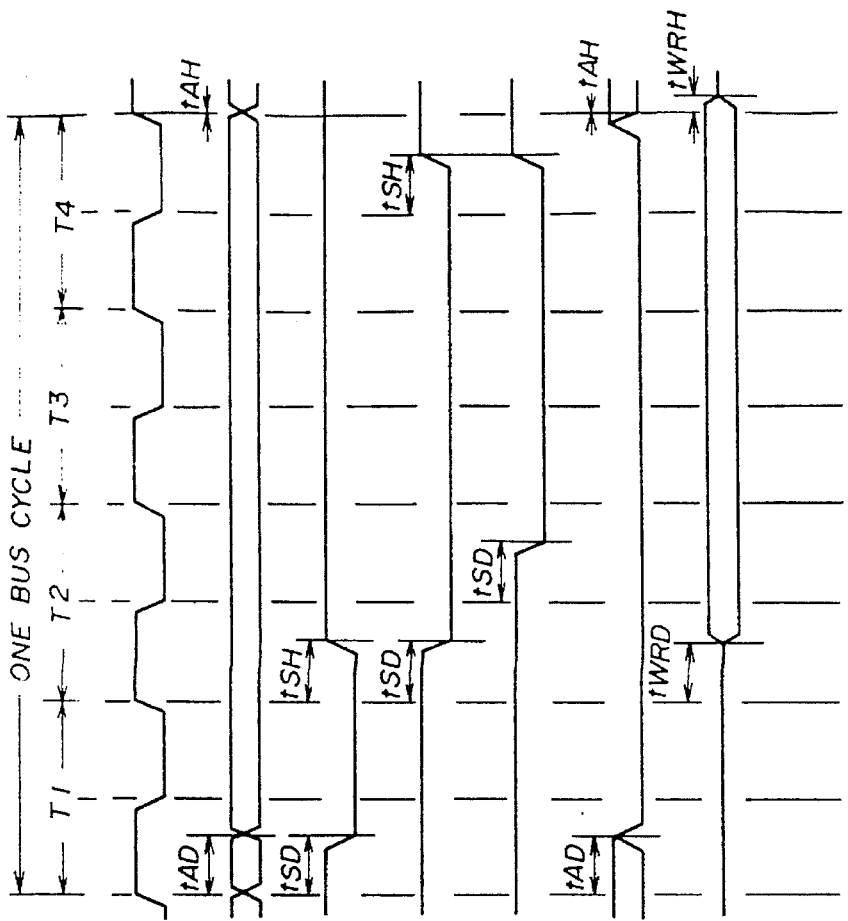
FIGS. 7A–7G show timing charts for write timing associated with a CPU core according to the present invention.

The CPU core 16, in a read cycle, samples data at the falling edge of the clock at a time T4 in FIG. 6G, and in a write cycle, the processor outputs data for a time period between the rising edge of the clock at a time T2 and the falling edge of the clock at a time T1 in FIG. 7G.

<TERMINAL ELEMENT RELATING TO ADDRESS BUS>

A0–23 (Address Bus): Address-Bus Output Terminal Elements

These 24-bit three-state bus-output terminal elements are for sending address data provided from the system bus to the system side. The CPU core 16 can address, through an address-bus output signal, 16 megabytes of data. The address varies on the rising edge of the clock at a time T1 in FIG. 6B and so on.

<TERMINAL ELEMENT RELATING TO BUS CONTROL>

ST0–2 (Status Code): Processor-State Output Terminal Element

These terminal elements are ones for sending out, to the system side, three-state output signals indicating the state associated with the operation currently performed in the CPU core 16. FIG. 23 represents the relationship between data associated with the above three-state output signals ST0–2 and the states in the CPU core 16.

The three-state signals vary on the rising edge of the clock at a time T1 in FIG. 6B.

BSB (Bus Start) Terminal Element: Bus-Cycle Start Output Terminal

This BSB terminal element is for sending to the system side a BSB signal indicating bus-cycle start.

The BSB signal indicates the bus-cycle start by outputting low levels in all of the bus cycles.

Figure 8:
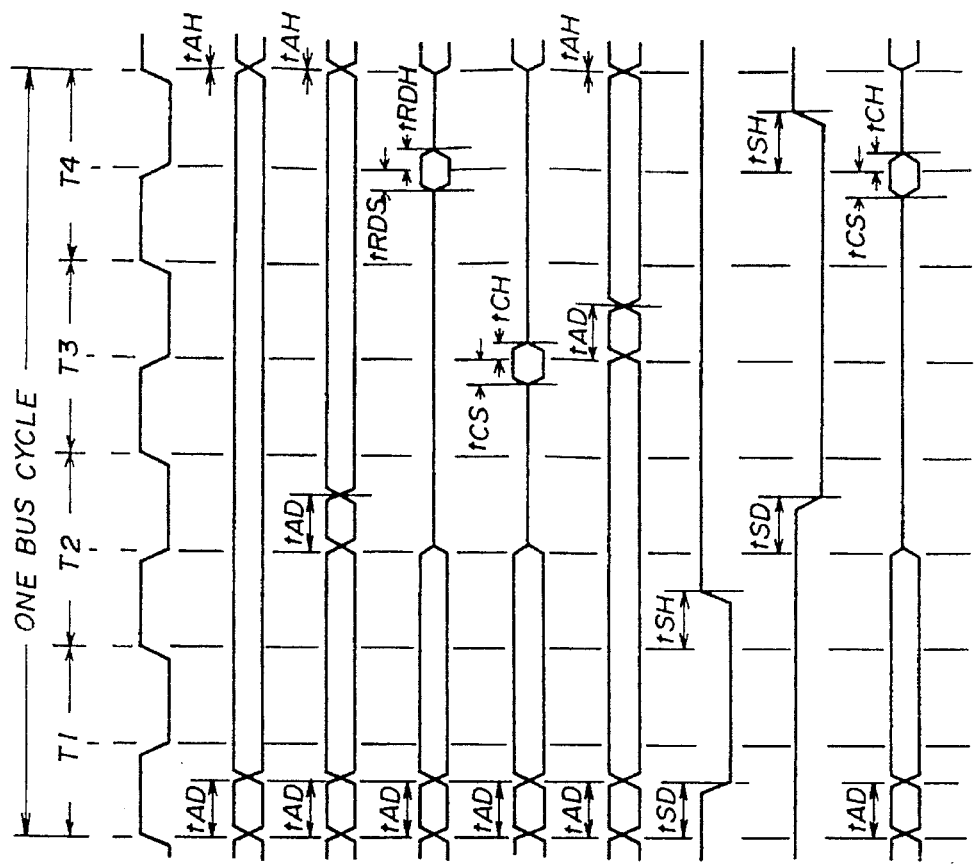
FIGS. 8A–8I show timing charts associated with signals sent out from terminals provided on a CPU core according to the present invention.

(Each bus cycle comprises periods T1, T2, T3 and T4 shown in FIGS. 6A, 7A and 8A. Each period of T1–T4 is a time starting from the time on the positive transition (rising edge) of the clock CLK in the signal FIG. 6A for example and ending at the time immediately before the subsequent positive transition of the clock actually, although FIGS. 6A, 7A and 8A show as if each the period of T1–T4 started from the time immediately after the positive transition and ended at the time on the subsequent positive transition.)

The BSB signal is sent from the CPU core 16 for a time period between the rising edge of the clock at a time T1 and the rising edge of the clock at a time T2, as shown in FIG. 6C. The BSB terminal element goes to a high impedance state in response to the signal input to a below described bus-enable input terminal element BE and to the signal input to a below described bus-float input terminal element BF. The BSB terminal element is a three-state output terminal element which may be in one of three states, that is, a low level, a high level and a high impedance, in its output. The address, data, below described RWB, ASB, DSB, SIZE, LVL, PDB and ST0–2 terminal elements are also terminal elements, each of which becomes to act as a three-state terminal in response to the signal input to the bus-enable input terminal element BE and the signal input to the bus-float input terminal element BF. Further, each of the below-described BACK and EMUM terminal elements becomes to act as a three-state output terminal element in response to the signal input to the bus-float input terminal element BF.

RWB (Read/Write): Read/Write Output Terminal Element

The RWB terminal element is one for sending to the system side an RWB signal indicating whether the CPU core 16 is in the reading state or in the writing state. The RWB signal goes high to indicate the read cycle and goes low to indicate the write cycle.

The RWB signal varies on the rising edge of the clock at a time T1 in FIG. 6F.

ASB (Address Strobe): Address Strobe Output Terminal Element

The ASB terminal element is for sending to the system side an ASB signal for indicating as to whether or not there exists information mentioned below in the system bus 2. The ASB signal sent out from the ASB terminal element goes low to indicate the above address, status codes (ST0–2), RWB, and below-described USB, PDB, and SIZE signals are valid on the bus.

The ASB signal is output for a time period between at the rising edge of the clock at a time T2 and the falling edge of the clock at a time T4 in FIG. 6D.

DSB (Data Strobe): Data Strobe Output Terminal Element

The DSB terminal element is for sending to the system side a DSB signal. The DSB signal goes low to indicate that the peripheral devices should drive the data bus while the CPU core 16 is in the read cycle, and to indicate that the processor is outputting valid data on the data bus while the CPU core 16 is in the write cycle.

The DSB signal is sent for a time period between the falling edge of the clock in T2 and the rising edge of the clock in T4 in FIG. 6E, in the read cycle, and for a time period between the falling edge of the clock in T2 and the rising edge of the clock in T4 in FIG. 7E, in the write cycle.

DACK (Data Acknowledge): Data Acknowledge Input Terminal Element

The DACK terminal element is one for receiving a DACK signal indicating whether or not data transfer from the system-side device has been completed. The DACK signal goes low to indicate that the data transfer performed by the peripheral device has been completed.

The DACK signal is sampled by the CPU core 16 at the time of the falling edge of a clock in T3 in FIG. 6H.

SIZE Transfer Data Size): Transfer Data Size Output Terminal Element

The SIZE terminal element is one for sending to the system side a SIZE signal indicating a data transfer size in the CPU 16. The SIZE signal is low to indicate 8-bit data being transferred and is high to indicate 16-bit data being transferred.

The SIZE signal varies at the time of the rising edge of the clock in T1 in FIG. 6B.

BREQB (Bus Request): Bus Request Input Terminal Element

The BREQB terminal element is for receiving a BREQB signal which is used for the system-side devices to request that the system-side devices access the CPU core 16 and system bus 2. The BREQB signal goes low to indicate that the system-side devices request the processor to allow the use of the bus. (Hereinafter, such request state may be expressed as a state where a bus control right is requested.)

The BREQB signal, being an asynchronous signal, is sampled by the CPU core 16 at the time of a rising edge in an internal machine-cycle.

BACK (Bus Acknowledge): Bus Acknowledge Output Terminal Element

The BACK terminal element is for sending to the system side a BACK signal indicating that the CPU core 16 surrenders the system-bus-2 control right. The BACK signal goes low to indicate to the system-side devices that the processor surrenders the bus control right.

The BACK signal varies on the rising edge in a clock at a time T1 in FIG. 6B.

SACK (Size Acknowledge): Size Acknowledge Input Terminal Element

The SACK terminal element is for receiving a SACK signal indicating a port size in the system-side devices. The SACK signal is low to indicate that the above port size is 8 bits and is high to indicate that the port size is 16 bits. The CPU core 16 may perform dynamic bus sizing processing as a result of the SACK signal provided thereto.

The SACK signal is sampled by the CPU 16 at the time of the falling edge in a clock at a time T3 in FIG. 6H.

LVL (Level): Access-Right Indicating Output Terminal Element

The LVL terminal element is for sending an LVL signal acting as an access-right indicating signal to the system side. The LVL signal goes low to indicate that the cycle of operation which the processor currently performs is a privilege level 0 cycle. The LVL signal goes high to indicate that the cycle of operation which the processor currently performs is a privilege level 1 cycle.

A privilege level 0 cycle means the bus cycle at a privilege level 0. Privilege level 0 means a higher-rank privilege level in which the L flag in the PSR (Processor status register) is "0", or it means all exception processing. Privilege level 1 means a lower-rank privilege level in which the L flag in the PSR (Processor status register) is "1".

The LVL signal varies at the rising edge of the clock at a time T1 in FIG. 6B.

BE (Bus Enable): Bus Enable Input Terminal Element

The BE terminal element is for receiving a BE signal for surrendering the system-bus-2 control right to the system-side devices. The BE signal goes low when the processor surrenders the bus control right asynchronously. The provision of the BE signal is valid in all cycles (a reset cycle and a processor stop cycle (HALT)), independently from all the other input control signals. When the BE signal is low, the above address bus terminal elements (A0–23), data bus terminal elements (D0–15), processor status terminal elements (ST0–2), RWB terminal element, LVL terminal element, BSB terminal element, SIZE terminal element, ASB terminal element, DSB terminal element and then below described PDB terminal element go to high impedance state.

PDB (Program/Data): Access-Area Indicating Output Terminal Element

The PDB terminal element is for sending to the system side a PDB signal for indicating the area being accessed by the CPU core 16. The PDB signal goes low to indicate that the cycle of operation which the processor currently performs involves accesses of a data area. The signal goes high to indicate that the current cycle of operation of the processor involves accesses to a program area.

The PDB signal varies at the rising edge of the clock at a time T1 in FIG. 6B.

<TERMINAL ELEMENT RELATING TO INTERRUPT CONTROL>

RES (Reset): Reset Input Terminal Element

The RES terminal element is for receiving a reset (RES) signal. The RES signal is used for starting after resetting the processor. The RES signal is an asynchronous signal and the processor ignores all other interrupts during the time that the signal is low. The CPU core 16, after it detects that the RES signal is low for a time period longer than two CLK cycles and thereafter detects a high level in the same RES signal for two CLK cycles, begins performing the reset sequence.

AVRB (Auto Vector Request): Auto-Vector Request Input Terminal Element

The AVRB terminal element is for receiving an AVRB signal for specifying whether the processor performs vector number generation using an auto-vector method or an external vector method. AVRB signal is sampled by the CPU core 16 simultaneously to provision the relevant interrupt request. The CPU core 16 performs the operation using the auto-vector method if the AVRB signal is low and uses the external vector method if the signal is high. In the external vector method, an interrupt acknowledge cycle operation is performed.

INT0–3 (Interrupt Request: Interruption Request Input Terminal Elements

The INT0–3 terminal elements are for receiving an interrupt request signal requesting to interrupt the execution of the CPU core 16. The signal provided to the INT0–3 terminal elements is an asynchronous signal and is accepted by the CPU core 16 if the CPU core 16 detects the same level for two internal machine cycles.

The relationship between the input signal provided to the four terminal elements INT0–3 and the relevant interrupt levels is indicated in FIG. 24.

<TERMINAL ELEMENTS RELATING TO BUS EXCEPTION CONTROL>

BERR (Bus Error): Bus Error Input Terminal Element

The BERR terminal element is for receiving a BERR signal for informing the processor that error has occurred in the currently performed bus-cycle operation. When the CPU core 16 samples a low level BERR signal at the time of the falling edge of the clock at time T1 in FIG. 6H, the CPU core 16 performs bus error exception processing.

BRTY (Bus Retry): Bus Retry Input Terminal Element

The BRTY terminal element is for receiving a BRTY signal for requesting the processor to retry the bus cycle. The CPU core 16, when samples a low level of the BRTY signal at a time of the falling edge of the clock in a time T3 in FIG. 6H, repeatedly performs the same bus cycle, after the completion of the relevant bus cycle.

<TERMINAL RELEVANT TO CLOCK>

CLK (Clock): Clock Input Terminal Element

The CLK terminal element is for receiving a system clock (CLK) signal. Stopping of the input of the CLK signal causes the processor to stop. Resumption of the CLK signal input causes the processor to resume connecting processing. The CLK signal may be stopped in any phases.

<TERMINAL ELEMENT RELATING TO EMULATOR>

EMUM (Emulation Mode): Emulation Mode Output Terminal Element

The EMUM terminal element is one for sending to the system side that, in the monitor mode, the program currently being executed by the processor, which the processor currently performs, is in a monitor mode in the emulator 24. If provision such as a watch dog timer and so forth exists peripherally to the processor, the relevant function is prevented from acting when the output EMUM signal is low.

<TERMINAL ELEMENT RELATING TO TEST>

BF (Bus Float): Bus Float Input Terminal Element

The BF terminal element is one for receiving a BF signal causing all the output terminal elements for the system side to go to the high impedance state. When the BF signal goes low, the CPU core 16 causes the output terminal elements to go to the high impedance state asynchronously.

The provision of the BF signal is valid in all the operation cycles (a reset cycle and a processor stop cycle (HALT)), independently from all the other input control signals. The above address sub terminal elements (A0–23), data bus terminal elements (D0–15), processor status terminal elements (ST0–2), RWB terminal element, LVL terminal element, PDB terminal element, BSB terminal element, SIZE terminal element, ASB terminal element, DSB terminal element, BACK terminal element, and EMUM terminal element all go to the high impedance state.

TEST (Test): Test Input Terminal Element

The TEST terminal element is for receiving a TEST signal used for testing the processor. The TEST signal is normally high.

Next, the emulator connecting-exclusive terminal 18 will be described.

The number of the terminal elements in the emulator connecting-exclusive terminal 18 provided on the CPU core 16, that is, the number of signal lines constituting the emulation bus 19 is smaller than that in the system-bus terminal 17 provided on the CPU core 16. Such a reduction in the number of terminal elements in the emulator connecting-exclusive terminal 18 in comparison to the system-bus terminal 17 is possible for the two reasons described below. First, the emulator connecting-exclusive terminal 18 does not include the terminal elements of the system-bus terminal 16 that are not required in the monitor mode. Second, in the emulator connecting-exclusive terminal 18, one terminal element may be used for sending and receiving a plurality of signals. In order to enable such multi-purpose use, the CPU core 16 appropriately selects signals to be sent/received through the emulator connecting-exclusive terminal 18.

That is, the CPU 16 multiplexes data as described below. As a result of the multiplexing, different data may be sent in the first half and the second half of one bus cycle, for the following terminal elements: EAD0–7 and 8–15; and EA8ST0, EA9ST1, EA10ST2, EAD11EM, EA12DA, EA13DD, EA14JM, EA15DI, and ESIZE.

By means of supplementary explanation, in the normal operation mode, in other words the case where the CPU core 16 accesses the system side, when the CPU core 16 sends an address to the semiconductor memory so as to read the corresponding data for example, a certain time is required for reading data. As a result, it is necessary to continuously send the same address for a time period between a time T1 and a time T4 in one bus cycle shown in FIGS. 8A–8I, for example. (The respective times T1, T2, T3 and T4 in one bus cycle may be simply referred to as T1, T2, T3 and T4, hereinafter.) Thus, terminal elements for sending addresses and terminal elements for inputting/outputting data are required.

On the other hand, in the monitor mode where the emulator 24 and CPU core 16 may access one another, there is no case where data is directly read from a memory. Thus, at the time when a relevant address is determined, the terminal element which has sent the relevant address may then be used to input the relevant data. Thus the CPU core 16 in the embodiment multiplexes data to be input/output through the terminal.

In a case of operation through the terminal elements EAD0–7 shown in FIG. 8D, a relevant address is sent out for the time period including T1 and the first half of T2. Then, data is read for the remaining time period, namely the second half of T2 up to and including T4.

The CPU core 16 in the embodiment is provided with the emulator connecting-exclusive terminal 18 as shown in FIG. 25. These terminal elements is described below.

EAD0–7(Address/Data Bus), EAD8–15: Address and Data Bus Terminal Elements

On the EAD0–7 terminal elements, and EAD8–15 terminal elements, address and data are passed as a result of appropriately multiplexing address and data passing through the address bus terminal elements A0–A7 and data bus terminal elements D0–7 described above. To put it concretely, an address is sent out through the terminal elements EAD0–15 for T1 and T2 shown in FIGS. 8C and 8D and the relevant data is written or read therethrough for T3 and T4.

In the normal operation state, in a case where the CPU core 16 accesses the system side, in other words, for the above time period of T3 and T4, the data bus in EAD0–15 is always in the output state independently of the read/write operation in the processor, outputting values existing on the data bus in the system-bus terminal 17. Thus, the emulator 24 may monitor data present in the system side via the EAD0–15. However, the data bus in EAD0–15 may be in the input state for the above time period both in a JAM mode and in the monitor mode where data is forcibly supplied from an emulation memory provided in the emulator element 23 to the CPU core 16.

In the monitor mode, the state of the data bus may be input or output during the above time period of T3 and T4 depending on the read state and write state according to below described respective modes 1–3.

In the normal operation mode, in a case where the processor surrenders the bus control right to an external device, the values given via A0–7 and D0–7 are output via the bus.

EA8ST0 (Address 8/Status Code 0): Address 8, Processor Status 0 Terminal Element EA9ST1 (Address 9/Status Code 1): Address 9, Processor Status 1 Terminal Element EA10ST2 (Address 10/Status Code 2): Address 10, Processor Status 2 Terminal Element Via the respective terminal elements EA8ST0, EA9ST1 and EA10ST2, during the first half of one bus cycle, the respective 8th bit, 9th bit and 10th of an address are output to the emulator 24. During the second half of the bus cycle, the signals ST0, ST1 and ST2 indicating the state of the CPU core 16 are output to the emulator 24 therethrough. Thus, the state of the CPU core 16 may be monitored through the emulator 24.

EA11EM (Address 11/Emulation Mode): Address 11, Emulation Mode Terminal Element

The EA11EM terminal element is for sending to the emulator address data output and emulation-mode output multiplexed tohether. Via the terminal element EA11EM, during the above T1 and T2, data associated with the 11th bit of an address is sent to the emulator 24. During the above T3 and T4, the EMUM signal is sent which indicates as to which of the emulator-side or system-side monitor mode is used.

EA12DA (Address 12/Data Acknowledge): Address 12, Data Acknowledge Input Terminal Element The EA12DA terminal element is used for address-data output to the emulator 24 and data acknowledge input, multiplexed together. During the above T1 and T2, the 12th bit of the address is sent to the emulator 24. During the above T3 and T4, a data acknowledge (DACK) signal is input to the CPU core 16 and then sampled by the CPU core 16. The DACK signal indicates that the emulation bus 19 has completed a data transfer operation. This DACK signal is a signal indicating that, in a case where the CPU core 16 accesses the emulation memory provided in the emulator element 23, transferring of data, which has been read from the memory and is to be sent to the CPU core 16, has been completed. A certain time is required to read the relevant data from the memory. This provision of the DACK signal allows the CPU core 16 to start performing subsequent processing.

To put it concretely, the DACK signal is sampled at the CLK falling edge in T3 as shown in FIG. 8E. The DACK signal goes low to indicate that the emulator side has completed the data transfer. Simultaneously, the DACK signal in the CPU core 16 for the system side goes low and the processor starts the T4 cycle.

EA13DD (Address 13/Disable Data Acknowledge): Address 13 DACK Preventing Input Terminal Element The EA13DD terminal element is used for address-data output to the emulator 24 of a data acknowledge preventing signal, multiplexed together. As shown in FIG. 8E, during the above T1 and T2, the 13th bit in the address is sent. During T3 and T4, the input function of the data acknowledge signal supplied from the system side to the CPU core 16 is made to be invalid. Then, a DDACK signal is received.

That is, the system-bus terminal 17 in the CPU core 16 includes the DACK terminal element via which the data acknowledge signal is received. However, if a problem occurring in a device connected to the system side, for example, prevents any data acknowledgement from being performed, the operation in the emulator 24 is also stopped. In order to avoid this stopping of the emulator, the EA13DD terminal element is provided. Via the terminal element, a pseudo-data-acknowledge signal is provided after the actual data acknowledge signal is invalidated. The provision of such a pseudo-data-acknowledge signal together with the invalidation of the actual data acknowledge signal enables the operation processing to be performed in the CPU core 16 without it being necessary to wait for the actual data acknowledge signal. The provision of the EA13DD terminal element enables the emulator to access the CPU core 16 even if the CPU core 16 is in waiting state due to a problem occurring in the system side.

EA14JM (Address 14/Data Jamming): Address 14 Data Forcible Input Terminal Element The EA14JM terminal element is used for output to the emulator 24 and a JAM-signal input, multiplexed together. The JAM signal indicates forcible input of data. As shown in FIG. 8D, during the above T1 and T2 the 14th address bit is sent, and the JAM signal is received during T3 and T4.

The JAM signal is sampled by the CPU core 16 at the clock falling edge in T4. The CPU core 16 does not read data from the data bus in the system bus 2 in the read state while the JAM signal is high. The CPU core 16 reads data from the data bus in the emulation bus 19 or reads a break code and then carries out soft break operation. Further, while the JAM signal is low, the CPU core 16 reads data from the data bus in the system bus 2.

EA15DI (Address 15/Disable Interrupt Request): Address 15 Interrupt Preventing Input Terminal Element The EA15DI terminal element is used for address-data output to the emulator 24 and input of an interrupt prevention signals multiplexed together. As shown in FIG. 8E, during the above T1 and T2 the 15th address bit is output, and the input of the interrupt preventing signal DIRQ is received during T3 and T4.

In a case where, in the monitor mode, an interrupt request occurs on the system side, certain problems may occur in the emulation operation if the operation performed in the CPU core 16 is transferred to the system side. The EA15DI terminal element is used to receive the signal to avoid such a problematic condition arising.

The interrupt prevention signal DIRQ is sampled by the CPU core 16 at the clock falling edge in the above T3. The CPU core 16, as a result of sampling the signal DIRQ, prevents an interrupt request from being handled while the DIRQ signal is low until the subsequent DIRQ signal is sampled. The above interrupt request is formed as a result of combining signals provided via INT0–3 terminal elements provided on the system-bus terminal 17.

ERWB (Read/Write): Read, Write Output Terminal Element

The ERWB terminal element is used for sending a signal indicating whether the data bus in the system bus in the CPU 16 is in the read state or the write state. The signal sent via the ERWB terminal element is high as to indicate the read cycle and is low to indicate the write cycle. In the monitor mode, the signal sent via the ERWB terminal element indicates the read/write state of the data bus in the emulator connecting-exclusive terminal 18.

ESIZE (Transfer Data Size/Size Acknowledge): Transfer Data Size Output Terminal Element The ESIZE terminal element is used for sending, to the emulator 24, a transfer data size output signal and size acknowledge output signal multiplexed together. As shown in FIG. 8F, during the above T1 and T2, a SIZE signal is sent which indicates the size of data transferred to the system side from the CPU core 16. During T3 and T4, a SACK signal is sent which indicates the port size associated with the data bus in the system bus 2, the data bus having been sampled by the CPU core 16 during the relevant cycle.

The SIZE signal is low to indicate that the relevant data size is 8 bits and is high to indicate 16 bits.

The SACK signal sent via the ESIZE terminal element comprises a SACK signal sampled from the system bus 2 side at the falling edge in T3 of the relevant bus cycle.

EBAB (Bus Acknowledge): Bus acknowledge Output Terminal Element

This terminal element acts identically to the BACK provided for the system side. The EBAB signal indicates that the CPU core 16 surrenders the control right associated with the system bus 2. The emulator 24, by using the signal, may determine whether the CPU is currently using the system bus or a peripheral device in using it. The rising edge in the EBAB signal lags by one internal machine cycle clock period behind the BACK signal for the system side. Thus, the EBAB signal changes after the bus right has been completely transferred to the CPU core 16 from the peripheral device.

EDBRQ (Disable Bus Request): BEQB Preventing Input Terminal Element

There may be a case where a EREQB signal is continuously provided due to a problem on the system-bus side. There may be another case where bus retries due to the BRTY signal are endlessly repeated. (The bus retry is performed when the CPU determines data it erroneously transferred thereto as a result of accessing a peripheral device. The bus-retry function causes the CPU to again output the relevant bus cycle by causing the BRTY to be low.) In such cases, the CPU core 16 may be prevented from continuing program execution. As a result, the monitor program in the emulator may not be executed. The EDBRQ terminal element is used for inputting a signal therethrough for enabling forcible transfer of the CPU core 16 from a problematic state such as mentioned above to a state where the CPU core 16 continues with subsequent processing. The input signal goes low to forcibly prevent the BREQB and BRTY inputs from the system side.

EBSB (Bus Start) Terminal Element: Bus Cycle Start Output Terminal Element

The EBSB terminal element is used for sending, to the emulator 24, an EBSB signal indicating the start of a bus cycle, as shown in FIG. 8G. The EBSB signal is a signal identical to the BSB signal in the system side.

EDSB (Data Strobe) Terminal Element: Data Strobe Output Terminal Element

The EDSB terminal element is used for sending, to the emulator 24, an EDSB signal. The EDSB signal indicates, in the read cycle, that the system-side device should drive the data bus. The same signal indicates, in the write cycle, that the CPU 16 outputs valid data onto the data bus. The timing chart for the signal is shown in FIG. 8H.

ECLKO (Clock Out): Clock Output Terminal Element

The ECLKO terminal element is used for sending the clock signal CLK to the emulator 24. This clock signal CLK is provided to the CPU core 16 from the system side. The reason for sending of the clock signal to the emulator 24 from the system side is to monitor whether or not the clock signal is being provided to the CPU core 16 from the system side.

ERESO (Reset Out): Reset Output Terminal Element

The ERESO terminal element is used for sending, to the emulator 24, the reset signal RE provided to the CPU core from the system side.

EPDM0 (Program/Data/Monitor Mode 0): Access Area Indicating Output Monitor Mode 0 Input Terminal Element This terminal element and an ELVM1 terminal element to be described below are used for receiving a signal used, in the monitor mode, to select the emulator connecting-exclusive terminal 18 through which access may be made by the emulator 24. Thus, the signal is used for switching the monitor mode.

The monitor-mode switching will be described with reference to FIG. 26, with combination of the signals provided through the terminal elements EPDM0 and ELVM1 as shown in the table. The monitor mode may be divided into the following four bus modes: normal mode, and monitor mode 1, 2, and 3.

The first bus cycle in interrupt processing of an external interrupt is defined to be in the normal mode.

The EPDM0 terminal element is used for data transfer with the emulator 24 of data resulting from multiplexing output data via a PDB terminal element (access area indicating output) and monitor mode input data 0. As shown in FIG. 8I, during T1 and T2, a PDB signal is sent out which indicates whether a program or data area in the CPU core 16 is accessed. At the rising edge of the clock in T4 in FIG. 8I, EMON0 input data is sampled by the CPU core 16, the input data setting the monitor mode in the subsequent bus cycle.

The monitor-mode switching by means of the EMON0 input data becomes valid at the last cycle in the relevant bus cycles. Thus, when long-word data is obtained as a result of appropriate accessing, the monitor-mode input made during the first half of the word bus cycle is ignored. Then, the monitor-mode setting made during the second half of the same word bus cycle is used for determining the monitor mode in the subsequent bus cycle.

The CPU core 16 in the present invention has a 16-bit data bus. Thus, when long words comprising 32 bits are to be obtained, two accesses must be performed, once for each 16-bit word in the long word. There may be a case where the monitor mode is altered during the first half of the bus cycle in the relevant long word access. Thus, access is made in the second half of the long word access in the monitor mode different from that in the first half of the long word access. As a result, different elements access the most significant 16 bits and in the least significant 16 bits of the 32-bit data. In one example, the normal mode is set in the first half and the monitor 1 mode is set in the second half. The most significant 16 bits are obtained as a result of accessing the emulator side and the least significant 16 bits are obtained as a result of accessing the system side. In order to avoid such a problematic condition, the monitor mode is prevented from being altered half way through a multi-bus-cycle operation.

ELVM1 (Level/Monitor Mode): Access-level Indicating Output Monitor Mode 1 Input Terminal Element Together with the above EPDM0 terminal element, the ELVM1 terminal element is used for receiving a signal for selecting the above mode.

Via the ELVM1 terminal element, during T1 and T2 in FIG. 8I, the LVL data is output. During T3 and T4, the EMON1 data is input. The EMON1 input data is sampled at the falling edge in T4 and sets the monitor mode in the subsequent bus cycle.

The normal mode and monitor 1, 2 and 3 modes will be described. One mode is determined from among these modes in accordance with the combination of the signals received via the above EPDM0 and ELVM1 terminal elements.

First, the normal mode will be described.

The normal mode is a mode where all of the bus control in the CPU core 16 is performed by using the system-side bus, that is, the system-bus terminal 17.

However, the emulator-side bus, that is, the emulator connecting-exclusive terminal 18 may be used for control the following operation: The emulator-side DACK (data acknowledge); IRQ preventing; system-side DACK preventing; emulator break comprising an interrupt for forcibly switching program execution from the system side to the emulator side so as to execute the program in the emulator side; reset; and forcible insertion of read data into the CPU core 16 from the emulation memory comprising a RAM provided in the emulator element 23.

The emulator-side DACK comprises a DACK signal provided to the above ED12DA terminal element during T3 and T4. The system-side IRQ preventing comprises a DIRQ signal provided to the above EAQ15DI terminal element during T3 and T4. The system-side DACK preventing comprises a DDACK signal provided to the above EA13DD terminal element during T3 and T4. The forcible data insertion from the emulator side comprises a JAM signal provided to the above EA14JM terminal element during the T3 and T4.

In the normal mode, from the emulator connecting-exclusive terminal 18, the same data is output as data which appears on the system-bus terminal 17 in the CPU core 16. The emulator mainly analyzes the bus and controls breakcode insertion by means of JAM, emulator-break occurrence by means of ENMI, and so on.

All of the address bus and the data bus are used in outputting data appearing at the terminal elements in the system-bus side in the CPU core 16. Further, the normal mode is forcibly set in the first bus cycle (stack write or interrupt acknowledge) in an interrupt due to the INT0–3 and in a lag interrupt, independently from signals received via the EPDM0 terminal element and the ELVM1 terminal element. (The above stack write means a process in which the CPU writes data, to be used for returning from an interrupt processing mode, in an area referred to as a stack provided in the RAM.)

The monitor 1 mode will be described.

The monitor 1 mode is a mode in which the CPU core 16 operates under the control of the emulator side. All of the bus control in the CPU core 16 is performed via the emulator-side bus, that is, the emulator connecting-exclusive terminal 18. Accordingly, the DSB in the system-bus terminal 17 is fixed to be inactive, that is, to be high. The DSB terminal element is used for sending a signal indicating whether or not valid data is output to the system bus 2 from the CPU core 16. Further, the signals at the respective terminal elements SACK, BERR, BRTY in the system-bus terminal 17 are invalid. However, the respective terminal elements BSB, ASB, BREQB, BE, RES and CLK may be used by the system side the same as in the normal mode. The DACK terminal element is used by the system side as a result of the EA13DD being set and the INT0–3 and AVRB terminal elements are used by the system side as a result of the EA15DI being set.

The monitor 2 mode will now be described.

This mode is a mode to be used when an operator of the emulator 24 desires to recognize data in the system side in the above monitor 1 mode. That is, in the monitor 2 mode, the CPU core 16 operates under the control of the emulator side the same as in the monitor 1 mode. However, in the monitor 2 mode, only when the CPU core 16 reads data is the system-bus terminal 17 activated, that is, DSB is set low for a time period between the rising edge in T2 and the falling edge in T4. Then, data in the system side is read through the system bus 17. Then, the read data is written into the emulator side. At that time, the SACK terminal element in the system-bus terminal 17 becomes valid.

The monitor 3 mode will now be described.

This mode is a mode to be used when an operator of the emulator 24 desires to write data into the system side in the above monitor 1 mode. That is, in the monitor 3 mode, the CPU core 16 operates under the control of the emulator side the same as in the monitor 1 mode. However, in the monitor 3 mode, only when the CPU core 16 writes data is the system-bus terminal 17 activated, that is, DSB is set low for a time period between the rising edge in T2 and the falling edge in T4. Then, data is written into the system side through the system bus 17. At that time, the SACK terminal element in the system-bus terminal 17 becomes valid.

The monitor-mode operation is performed in any of the above three kinds of modes.

Figure 14:
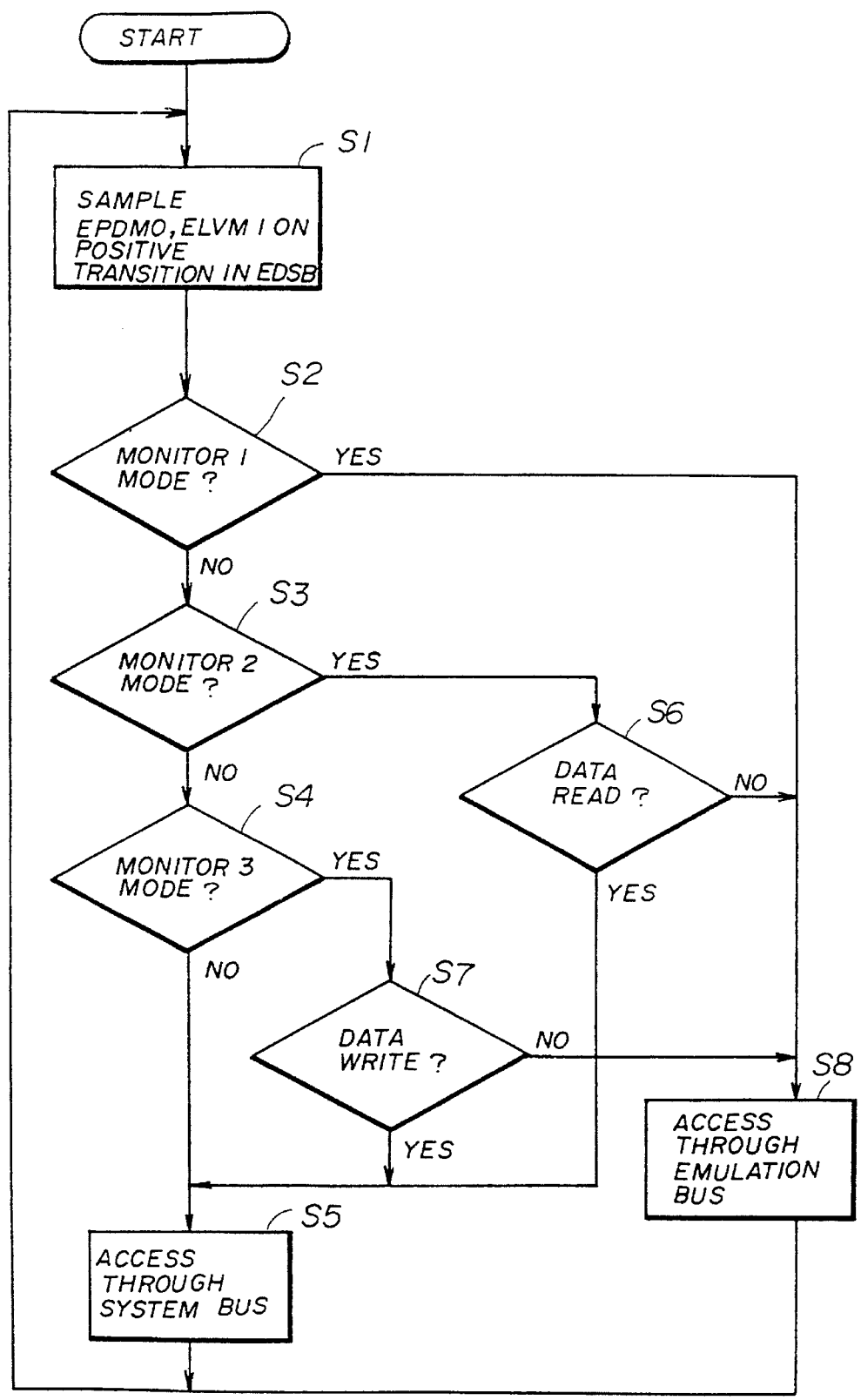
FIG. 14 shows an operation flow chart associated with operation for selecting one from among a normal mode and monitor modes 1–3 in a CPU core according to the present invention.

An operation flow in which any of the above monitor 1–3 modes will be selected will be described with reference to FIG. 14.

In a step S1 (the term 'step' will be omitted, hereinafter), on the rising edge of the EDSB signal acting as the above data strobe signal, the EPDM0 signal supplied to the above EPDM0 terminal element and the ELVM1 signal supplied to the above ELVM1 terminal element are sampled. In S2–S4, based on the combination of the above EPDM0 signal and ELVM1 signal, any of the above normal mode or monitor 1–3 modes is selected. That is, if the combination of the EPDM0 signal and ELVM1 signal is '0, 0', the monitor 1 mode is selected in S2; if the combination is '1, 0', the monitor 2 mode is selected in S3; if the combination is '0, 1' the monitor 3 mode is selected in S4; and if the combination is '1, 1', that is, if the results of all of S2, S3, and S4 respectively are NO, then the above normal mode is selected.

If the normal mode is selected, the access operation by the CPU core 16 is configured in S5 to be always performed through the system bus 2. If the monitor 2 mode is selected in S3, the access operation by the CPU core 16 is configured in S6 to be performed through the system bus 2 only in the data read state. If the monitor 3 mode is selected in S4, the access operation by the CPU core 16 is configured in S7 to be performed through the system bus 2 only in the data write state. If the monitor 1 mode is selected in S2, or if it is not the data read state in S6, or if it is not the data write state in S7, the access operation by the CPU core 16 is configured in S6 to be performed through the emulation bus 19.

EBK (Emulator Break) 0 and EBK 1: Emulator Break Terminal Elements

These terminal elements relate interrupt processing (this processing may be referred to as exception processing, hereinafter) and will now be described.

The CPU core 16 in the embodiment, since it acts as a CPU core for the system side, has an exception processing function dedicated to the monitor mode in addition to its inherent exception processing function. Any of 4 kinds of exception processing, as shown in FIG. 27, may be generated in a device such as the emulator element 23 and then supplied to the CPU core 16. The above 4 kinds of exception processing comprise: a reset; an emulator NMI1; an emulator NMI2; and an emulator break. The selection from among these kinds of processing will be determined, as shown in FIG. 28, based on the combination of signals supplied to the EBK0 and EBK1 terminal elements. The functions associated with these kinds of processing will be described.

RESET

This RESET is exactly the same as the 'reset' generated from the system side in the related art and is input via the RES terminal element. The execution of the RESET is determined based on the combination of signals supplied to the 'EBK0' and 'EBK1' terminal elements.

EMULATOR NMI1

The CPU core 16 in the embodiment employs both a so-called external vector method and an auto-vector method. In the external vector method, the CPU core 16, after it receives an interrupt request, obtains from the external device the relevant interrupt processing detail. In the auto-vector method, the CPU core 16 automatically determines the detail. However, a certain problem occurs in the external vector method as described below. When the CPU core 16 receives an emulation request from the emulator 24, since the vector address acting as the start address in the interrupt processing routine then changes, it becomes impossible to switch to a state where the monitor program in the emulator 24 is carried out. Thus, the CPU core 16 uses the auto-vector method always at the time of interrupt processing of ENMI1 and 2 as described below.

The NMI (non maskable interrupt) is the same as that in the related art. That is, a program has a certain portions where problems may occur if interrupt processing is performed during execution of those portions. For such portions, the system side sets inhibits interrupts. However, at the time of monitor read state, when the emulator 24 requests interrupt processing for such portions, the relevant interrupt is required to be performed. The emulator NMI1 allows an unconditional interrupt to the CPU core 16 in such a case.

The execution of this emulator NMI1 is instructed by the combination of the respective signals supplied to the respective 'EBK0' and 'EBK1' terminal elements provided in the emulator connecting-exclusive terminal 18 in the CPU core 16 in the embodiment.

As described above, the emulator NMI1 operation itself is not different from the NMI operation in the related art. The vector address, which causes the emulator NMI1 operation to be performed in the CPU core 16 in the embodiment, is set as to be a particular value. This setting is different between the related art and the present invention. That is, in the case of the emulator NMI1 in the embodiment, different from the normal IRQ, the relevant vector number is fixed at 04 via the auto-vector method. The relevant vector address is fixed at "000010", independently of the value stored in an EVBR (exception vector base register) acting as a register for storing therein the offset value of the vector address.

As a supplementary explanation of this matter, NMI request may come to the CPU core 16 from both the system side and emulator side. In the related art, the CPU has only one terminal element to which the NMI signal is supplied. Thus, the CPU cannot determine which request is to be accepted in such a case. In the embodiment according to the present invention, since the CPU core 16 has both the 'EKB0' and 'EBK1' terminal elements and also a vector address comprising a particular value is supplied, the collision in NMI operation instructed from the system side and emulator side can be prevented from occurring.

EMULATOR NMI2

The emulator NMI2 comprises, similar to the above-described emulator NMI1, an unconditional interrupt. Respects different from the emulator NMI1 are the ones described below. In the emulator NMI1, the relevant interrupt is generated in all cases. In contrast, in the emulator NMI2, the relevant interrupt is generated only in a case where the bus cycle immediately before the bus cycle in which the relevant emulator NMI2 occurs, has been performed in the CPU core 16. Therefore, it is possible to generate the interrupt without being affected by a pre-fetch in the emulator NMI2.

Further, in emulator NMI2, the same as in the emulator NMI1, different from the normal IRQ, the relevant vector number is fixed at 05 in the auto-vector method. The relevant vector address is fixed at "000014" independently of the value stored in the EVBR.

Further, also the execution of the emulator NMI2 is instructed by the combination of the respective signals supplied to the respective 'EBK0' and 'EBK1' terminal elements.

EMULATOR BREAK

This instruction results in operation the same as that resulting from the break point instruction in the related art. The emulator break comprises software interrupt by means of the EBRK (emulator break) instruction program code fetch. However, described below are differences from the break instruction in the related art. The relevant vector address is different and the relevant instruction may be executed from an address different from those of a break instruction in the system side.

In the emulator break, the relevant vector number is fixed to 06. The vector address is made to be fixed to be "000018" independently of the value stored in the EVBR. The EBRK instruction has a code "XXFE".

Since the emulator break is a so-called software interrupt, neither of the above 'EBK0' nor 'EBK1' terminal elements is used.

Both the above emulator NMI1 and emulator NMI2 are so-called hardware interrupts. A hardware interrupt causes the relevant interrupt processing to be performed from an instruction subsequent to the instructions which is being executed at the time when the relevant interrupt signal occurs. Thus, there may occur a problem since the interruption occurs at a point subsequent to the point at which it is actually desired. However, the interrupt may be requested even in the data read or write state.

In contrast, the emulator break is a software interrupt as mentioned above. Thus, the relevant interrupt processing can be performed at the point at which the relevant break is requested. However, the interrupt cannot be requested in the data read or write state.

Figure 19:
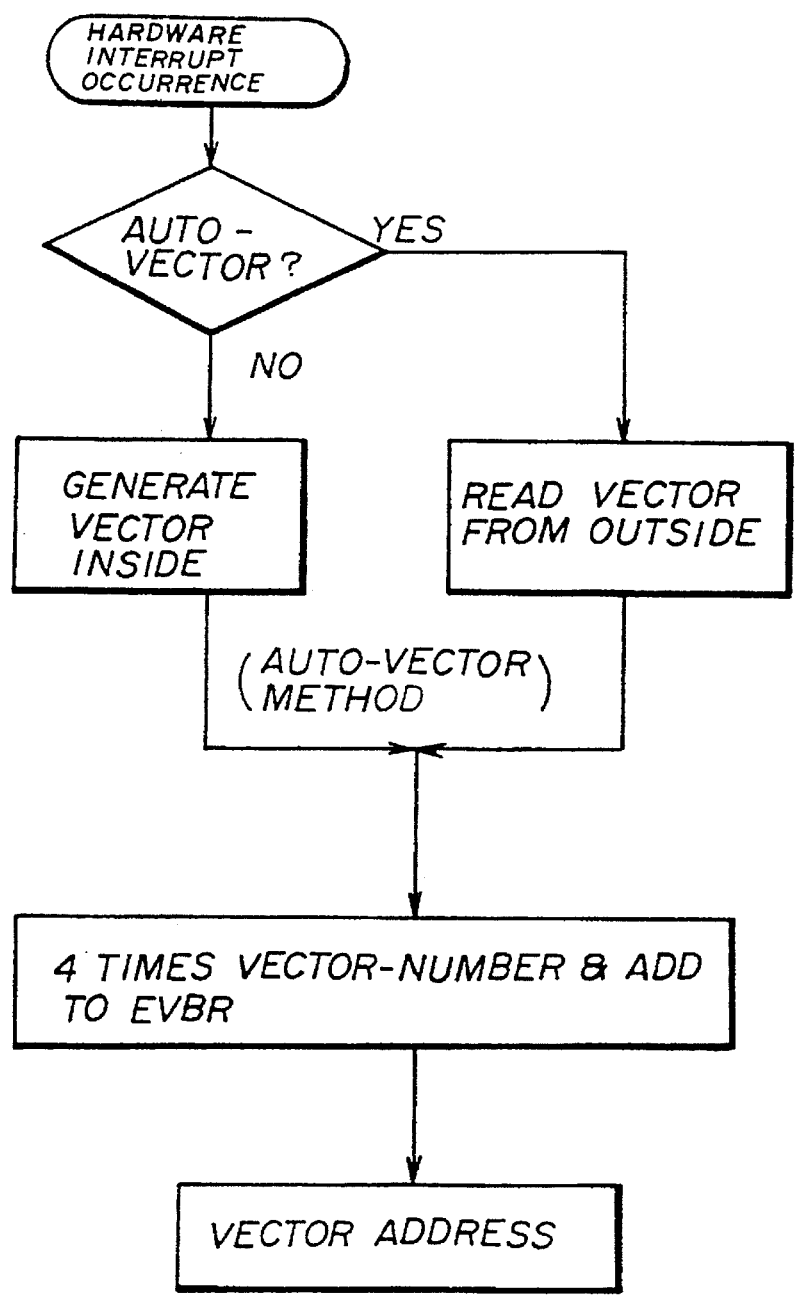
FIG. 19 shows an operation flow chart of a vector-address generating sequence in hardware interruption.
Figure 20:
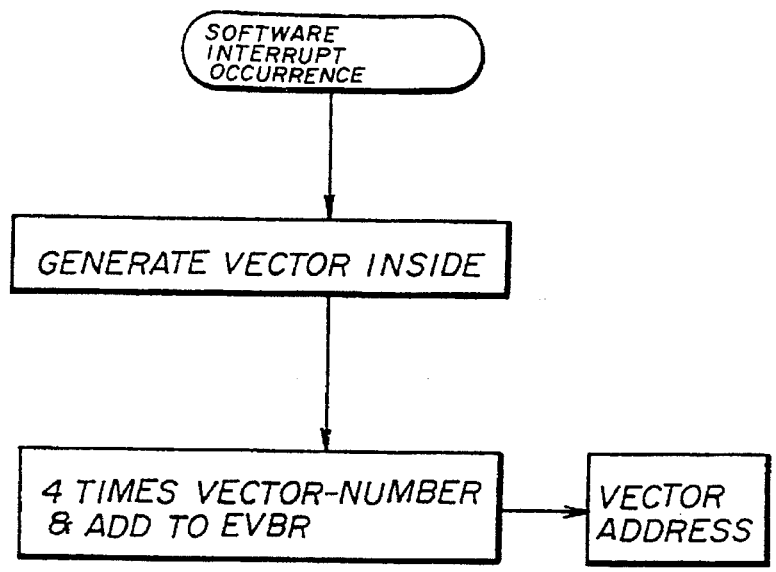
FIG. 20 shows an operation flow chart of a vector-address generating sequence in software interruption.
Figure 21:
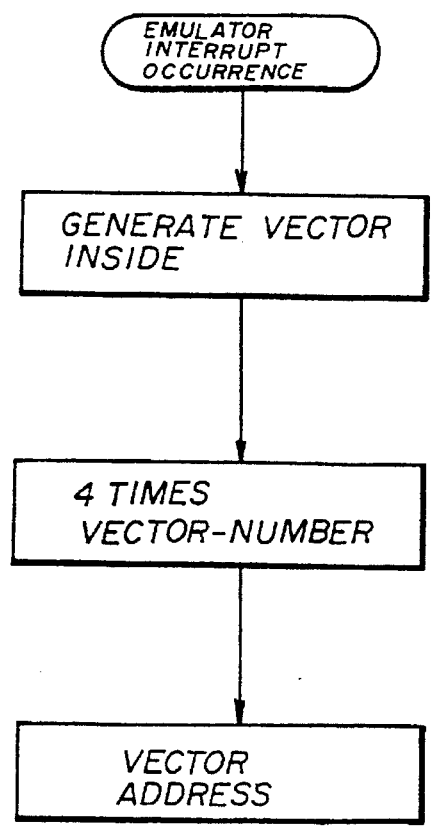
FIG. 21 shows an operation flow chart of a vector-address generating sequence in ENMI 1, 2 and EBRK.
Figure 22:
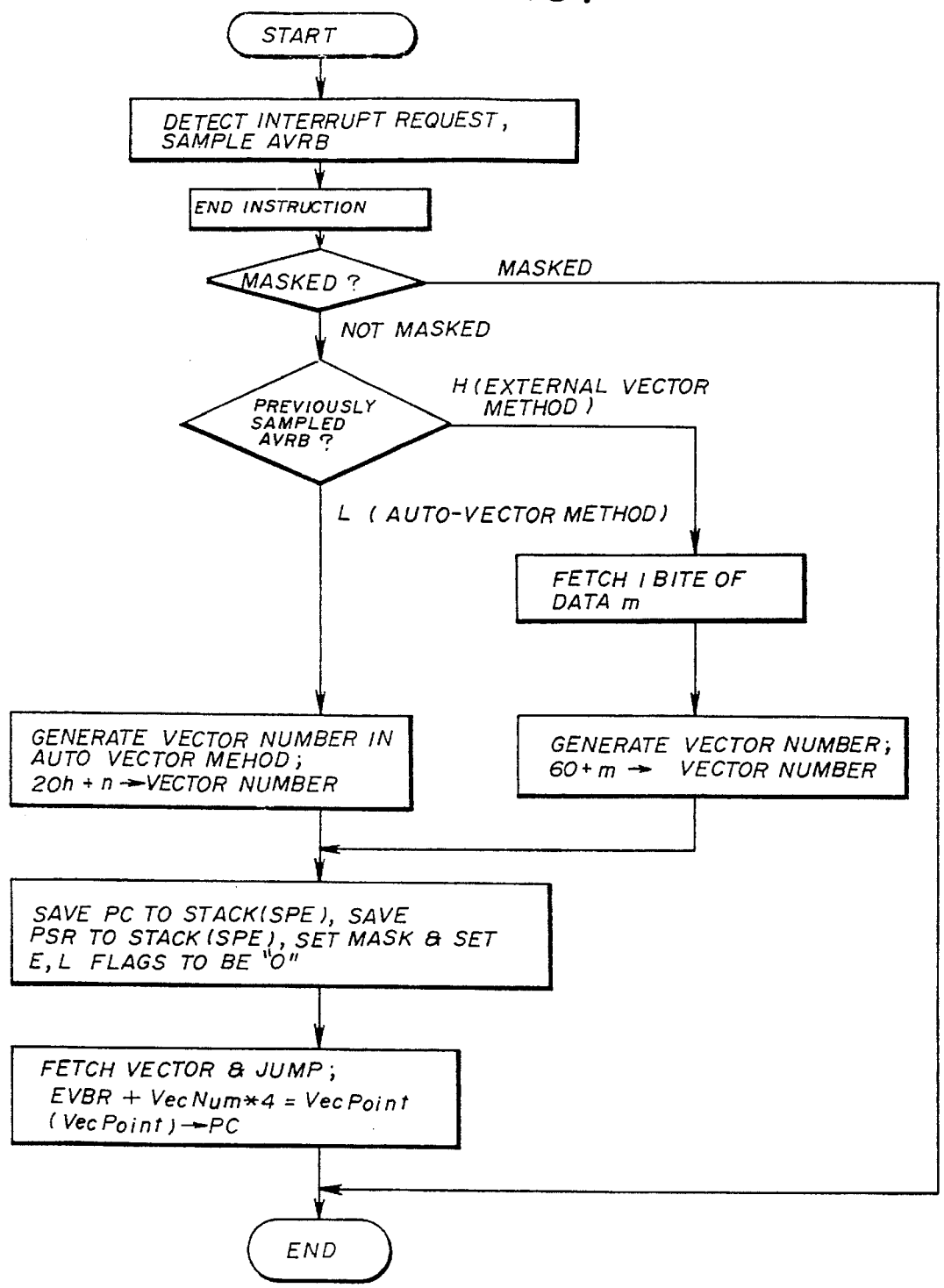
FIG. 22 shows a detailed operation flow chart of a vector-address generating sequence in hardware interruption.

With regard to the vector-address generation method in the exception processing, the method in the case of the hardware interrupt in the related art is shown in FIG. 19; the method in the case of the software interrupt is shown in FIG. 20; and the method in the case of the interrupt by means of the emulator NMI1, and 2, and emulator break described above is shown in FIG. 21. Further, a detailed operation flow of the hardware interrupt is shown in FIG. 22.

The provision of the above 'EBK0' and 'EBK1' terminal elements on the CPU core 16 as described above enables the special functions such as described above to be performed in the emulator NMI1, and NMI2, and emulator break states.

Further, as described above, the CPU core 16 in the embodiment of the present invention outputs the vector address as a fixed value independently of the value stored in the EVBR which stores therein the above vector address, even in the case of the emulator break acting as the software interrupt.

Next, terminal elements will be described which are not used directly by the emulator 24 but are used in a case where the CPU core 16 is formed as one chip acting as an ASIC.

EMEN (Emulation Enable): Emulation-interface use permission input terminal element A signal permitting the CPU core 16 to use the emulation bus is to be supplied to this terminal element. The supplied signal is low to permit use of all terminal elements in the emulator connecting-exclusive terminal 18 connected to the emulation bus 19. The signal is high to prevent use of all terminal elements in the emulator connecting-exclusive terminal 18. The EMEN terminal element is not connected to the emulation bus 19.

As shown in FIG. 3, as described above, the CPU core 16 is provided with the emulator connecting-exclusive terminal 18 in addition to the system-bus terminal 17 to be connected to the system bus 2. The emulator connecting-exclusive terminal 18 is connected to the emulator element 23 via the emulation bus 19. Thus, in the emulation operation mode, the emulator element 23 is connected to the CPU core 16 via the emulation bus 19, pod 21, and pod cable 22. Through this connection, control of the CPU core 16 and of data transfer relevant to the CPU core 16 are performed. In the non-emulation mode, the CPU core 16 does not use the emulator connecting-exclusive terminal 18 and, similarly to the case shown in FIG. 1, performs data transfer only with the system bus 2. Thus, the CPU core 16 performs the predetermined operation in the IC 15.

Figure 2:
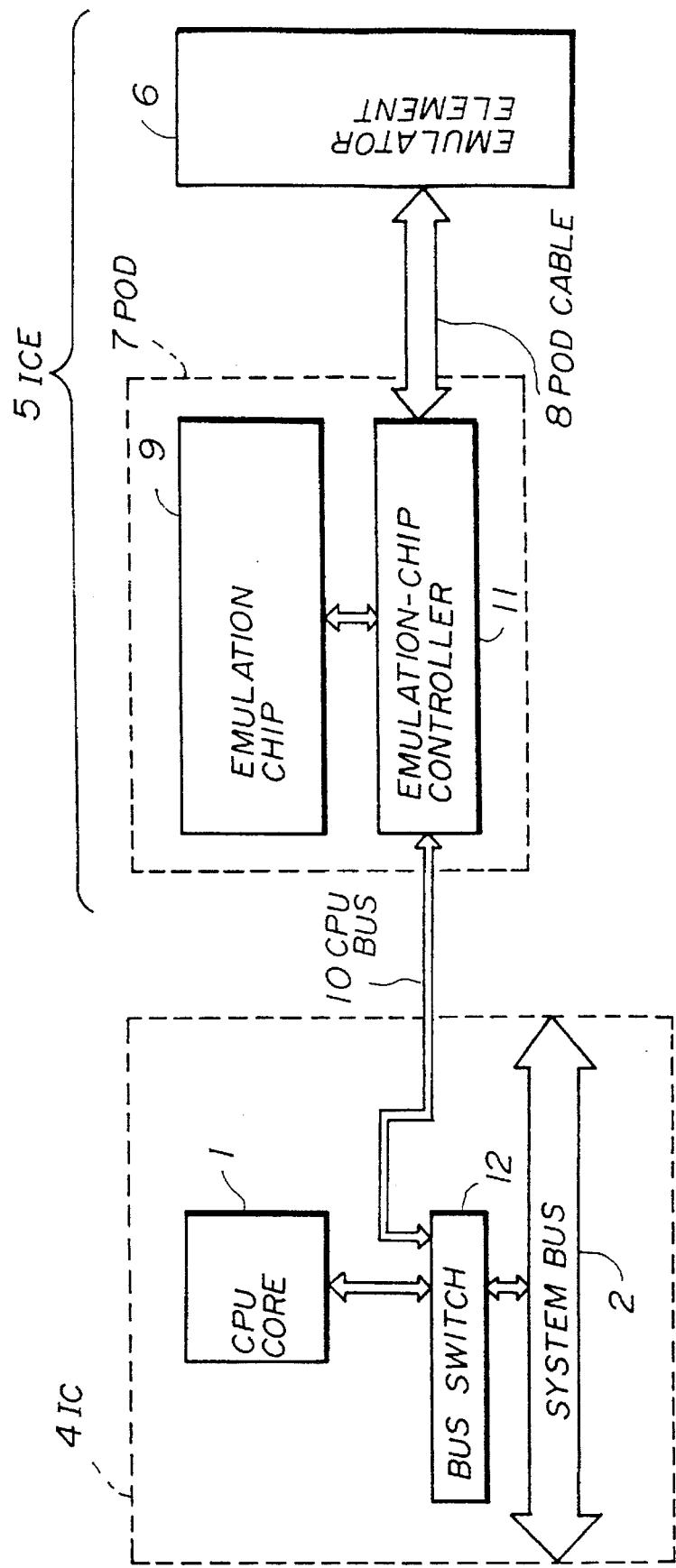
FIG. 2 shows a block diagram of a system used for implementing emulation operation in the related art.

The emulator element 23 and pod 21 respectively have functions the same as those of the emulator element 6 and pod 7 in FIG. 2. However, the pod 21 is not provided with the emulation chip 9 and is provided with an emulation-controller 20 connecting the pod cable 22 with the emulation bus 19. The emulation-bus controller 20 acts as an interface for connecting the functions associated with the emulation bus 19, connected to the emulator connecting-exclusive terminal 18 on the CPU core 16, with the functions associated with the pod cable 22 so that the connection does not result in any contradiction between the two functions. Such operation of the emulation-bus controller 19 makes the emulation environment in the system shown in FIG. 3 the same as that in the system in FIG. 2, when monitoring or control is performed by the emulator element 23.

Figure 4:
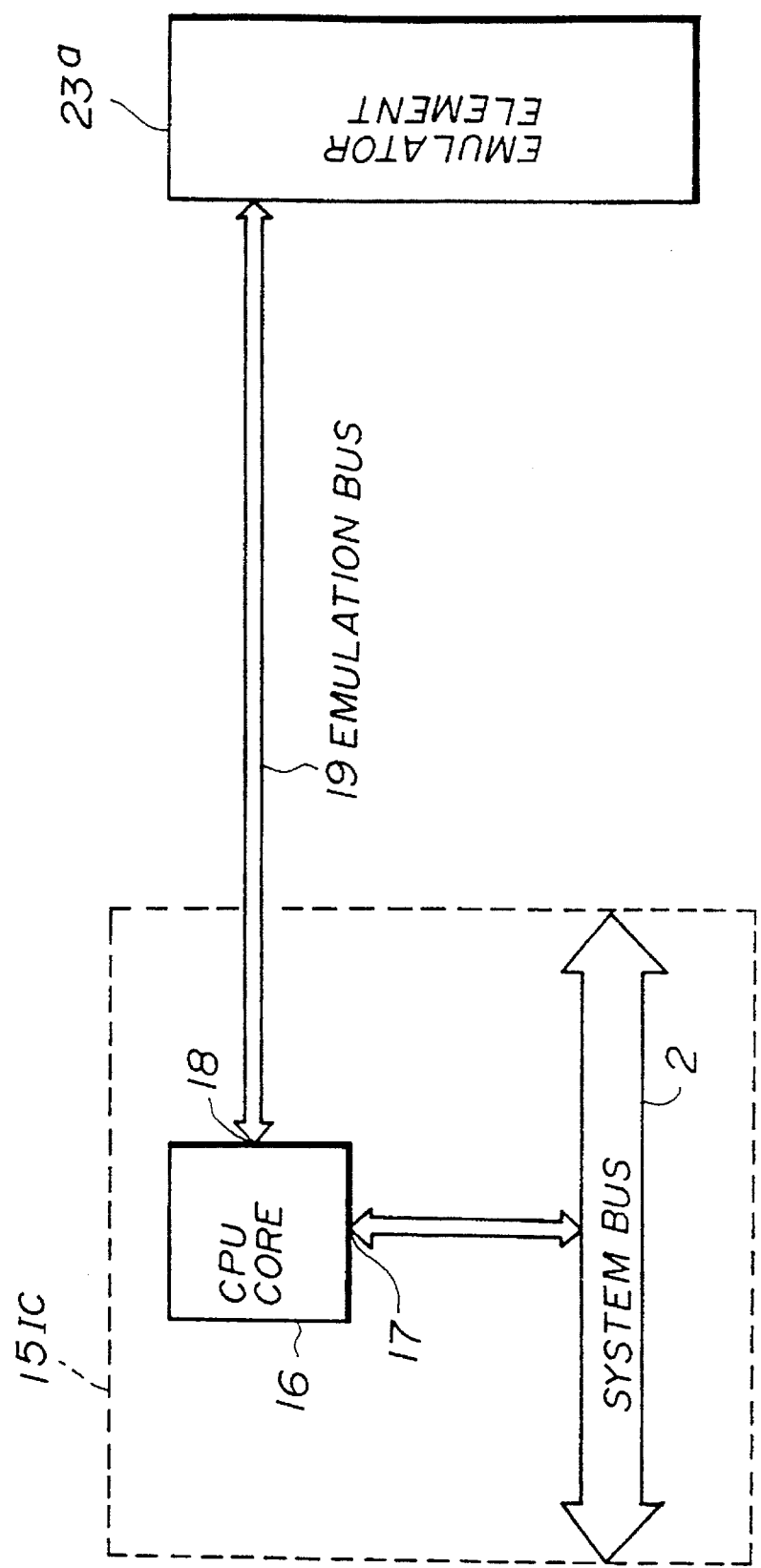
FIG. 4 shows a block diagram of another construction example of the emulation system according to the present invention.

Further, another emulation system may be considered where the function associated with the pod cable 22 is incorporated into the emulator element $23^a$. The emulation bus 19 is then directly connected to the above emulator element $23^a$. A construction example in such a case is shown in FIG. 4. In FIG. 4, the same reference numerals are given to elements the same as those in FIG. 3.

As described above, in the emulation system in the embodiment of the present invention, the connection of the emulator with the CPU core enables the operation described below to be performed. Whether or not a provision such as the pod is employed, the CPU core provided in the IC performs its functions even during the emulation operation mode, thus different from the emulation system in the related art.

The emulation bus 19 carries signals necessary for emulation. However, as detailed below, the number of terminal elements in the emulator connecting-exclusive terminal 18 on the CPU core 16, that is, the number of signal lines constituting the emulation bus 19 is smaller than the number of terminal elements in the system-bus terminal 17 on the CPU core 16, as shown in FIG. 5. Accordingly, in contrast to the construction in FIG. 2 where signals on the CPU bus 10 are brought to the outside, the number of signal lines taking signals to the outside of the IC is smaller in FIG. 5. Thus, the relevant IC package may have a reduced number of terminal elements and a low cost.

The reason why the number of terminal elements in the emulator connecting-exclusive terminal 18 may be smaller than that in the system-bus terminal 17 in the CPU core 16 is described as below. Certain terminal elements among the terminal elements in the system-bus terminal 17, are not necessary for the emulation operation and are not included in the terminal elements in the emulator connecting-exclusive terminal 18. Also, the CPU core 16 selects, at appropriate times, one from among the signals to be input/output via one terminal element so that a plurality of signals may be transferred via the terminal element.

As shown in FIGS. 3 and 4, these emulation systems do not operate in such a way that in the emulation operation mode the CPU core 1 is not used and the emulation chip is alternatively used as shown in FIG. 2. These emulation systems use the CPU core 1 in both the non-emulation mode and the emulation operation mode. Thus, the need for the emulation chip is eliminated. Accordingly, it is also not necessary to develop an emulation chip together with the development of the relevant CPU core, thus the development workload for the CPU core is reduced. In the construction example of FIG. 4, even the pod is not necessary, thus a further advantage is obtained.

Data transfer between the CPU core 16 and emulator element 23 or $23^a$ shown in FIG. 3 or 4 does not use a provision such as the bus switch 12 in the related art but uses the emulation bus 19 only. From the view point of the CPU core 16, all of the relevant signals are transferred via the emulator connecting-exclusive terminal 18 and the terminal inherent to the CPU core 16, that is, the system-bus terminal 17, is directly connected to the system bus 2. As a result, the signal transfer may be performed with the same timing in the emulation operation mode as in the normal operation mode.

Figure 5:
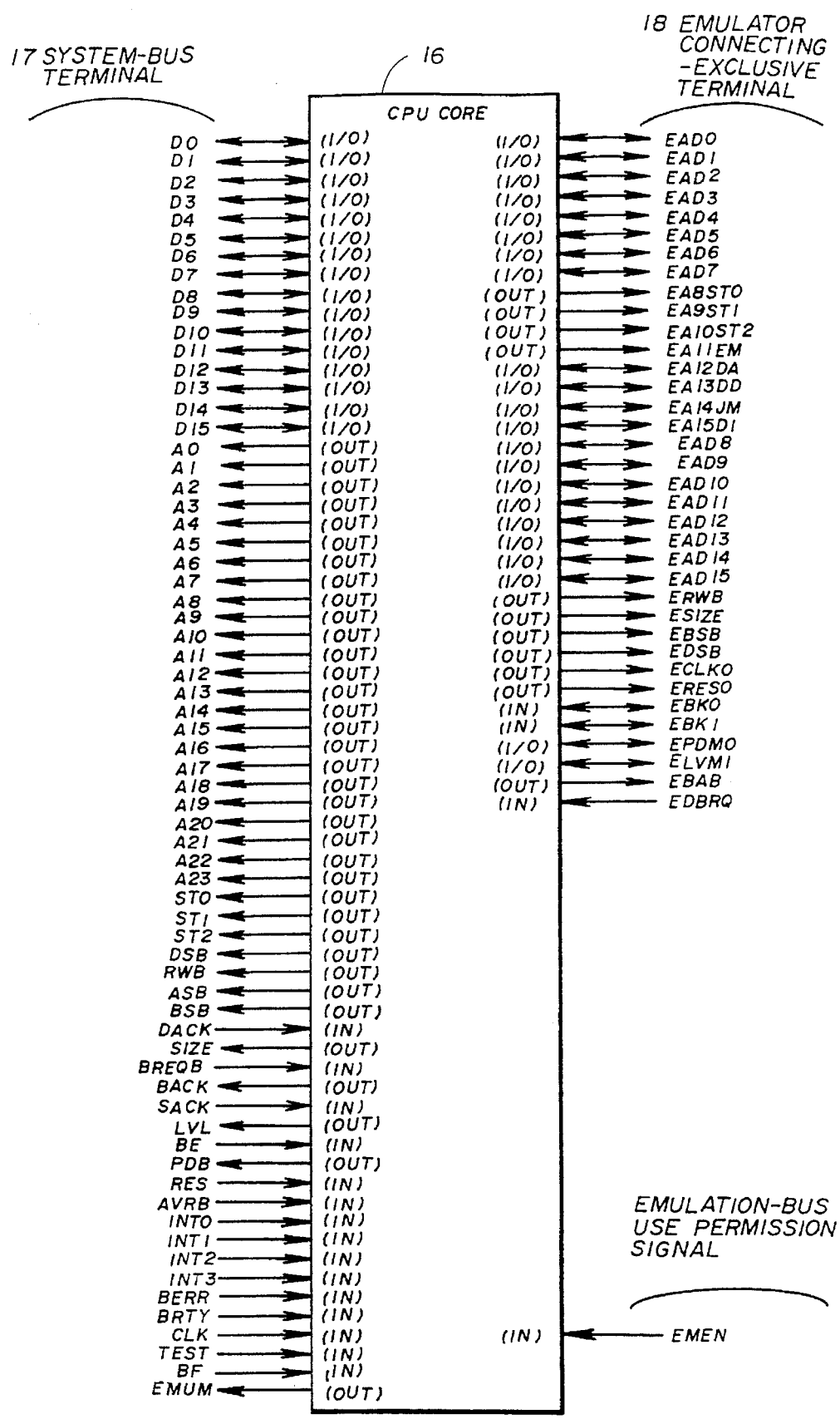
FIG. 5 shows a terminal arrangement diagram provided in a first embodiment of a CPU core according to the present invention.

Further, as shown in FIG. 5, the contents of signals in the emulation bus comprising signals transferred via the emulator connecting-exclusive terminal 18 are standardized. Thus, developing of an ICE based on the standard results in an ICE which is adaptable to any CPU core having an emulator connecting-exclusive terminals based on the above emulation bus standard.

Therefore, in development of an ASIC provided with a CPU core having the above emulator connecting-exclusive terminal, the emulator connecting-exclusive terminal on the CPU core may be formed as an external terminal on the ASIC. As a result, an emulation system similar to that shown in FIG. 3 or 4 can be implemented by simply connecting the emulation bus to the relevant external terminal.

Figure 9:
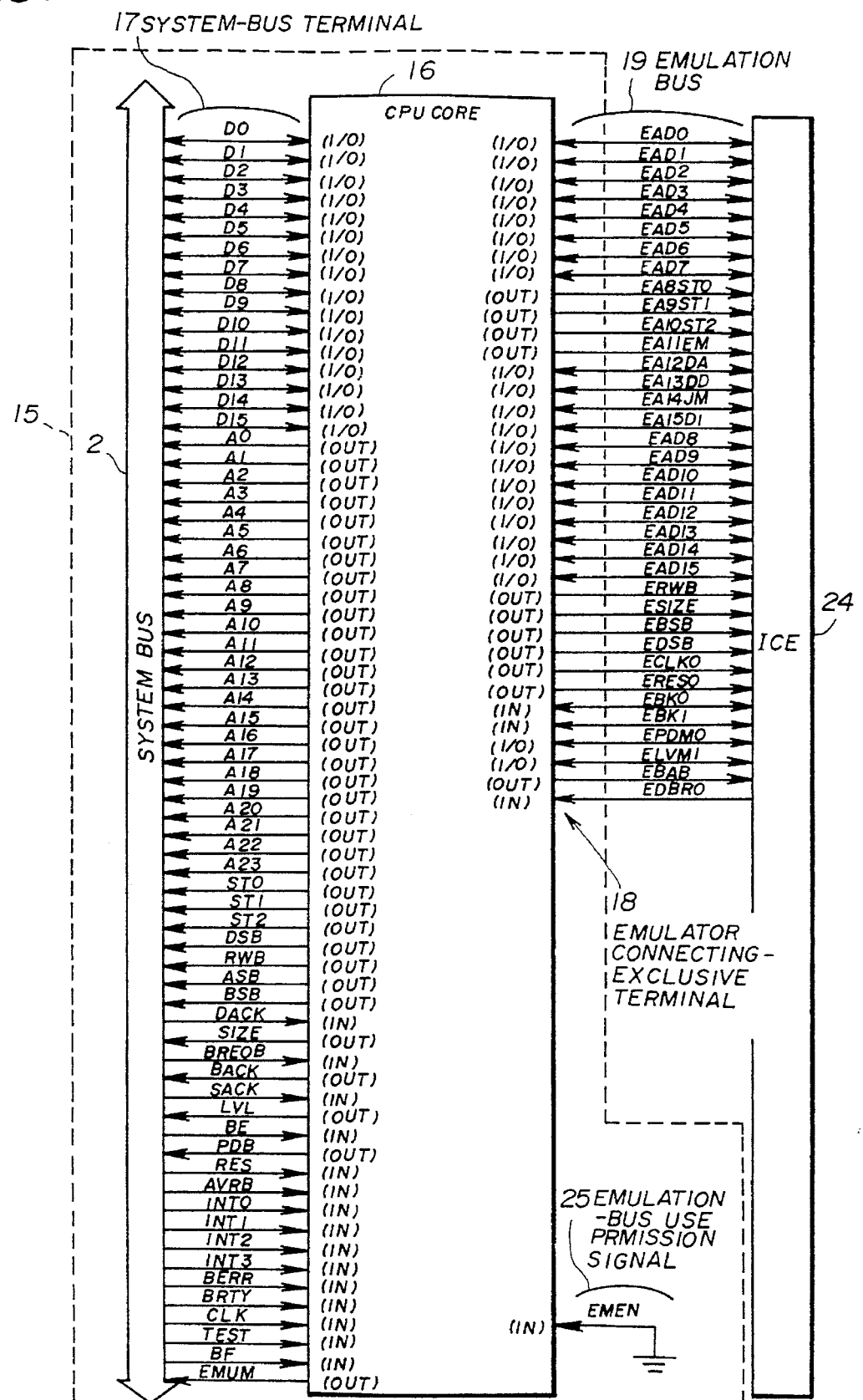
FIG. 9 shows a connection state diagram wherein the CPU core shown in FIG. 5 is connected to a system bus and to an ICE via an emulation bus.

FIG. 9 shows an embodiment in a case where an emulation system is formed by using the CPU core 16 shown in FIG. 5. The same reference numerals are given to elements that are the same as those in FIGS. 3 and 4.

The CPU core incorporated into the IC 15 is connected to the system bus 2 via the system-bus terminal 17 within the IC 15. The emulator connecting-exclusive terminal 18 provided on the CPU core 16 is connected to the emulation bus 19 and then the emulation bus is connected to the ICE 24. A low-level signal, acting as an emulation-bus use permission signal 25, is supplied from inside or outside of the IC 15.

In the emulation system shown in FIG. 9, during emulation, the ICE 24 performs data access with the CPU 16 only via the emulation bus 19. Even in the emulation operation state, the CPU 16 is connected to the system bus in a state the same as the normal non-emulation state. Thus, the signal transfer may be performed with the same timing as in the normal operation mode.

The ICE 24 may form an emulation system similar to the emulation system shown in FIG. 9 with a CPU core connectable with the emulation bus 19. The ICE 24 is adaptable to the emulation bus shown in FIG. 9 which has been standardized so as to be adapted to the emulator connecting-exclusive terminal 18. The above formation can be achieved without modifying the function of the ICE even if the relevant CPU core is not the CPU core 16 shown in FIG. 3 or 4. That is, any CPU core can implement an emulation system such as that shown in FIG. 9 together with a common ICE, no matter what architecture of the CPU core as long as the relevant CPU core is provided with an emulator connecting-exclusive terminal 18 conforming to the above-described emulation-bus standard.

Figure 10A:
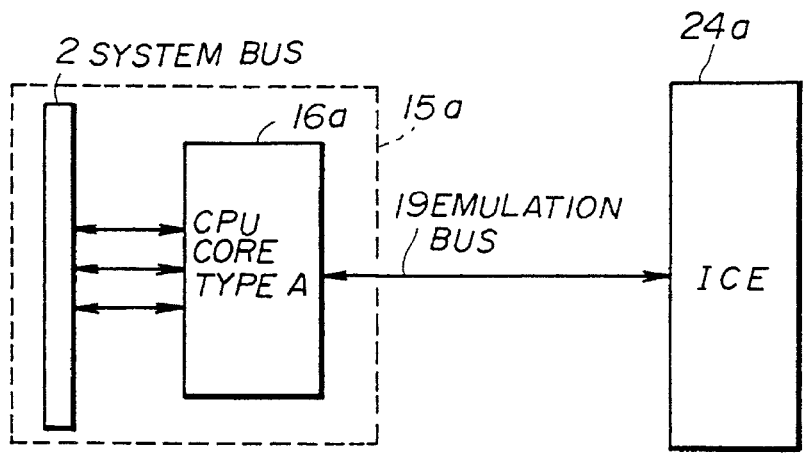
FIGS. 10A, 10B and 10C illustrate the capability of a common ICE to be used for different-architecture CPU cores (types A, B and C) according to the present invention, each having an emulator connecting-exclusive terminal.
Figure 10B:
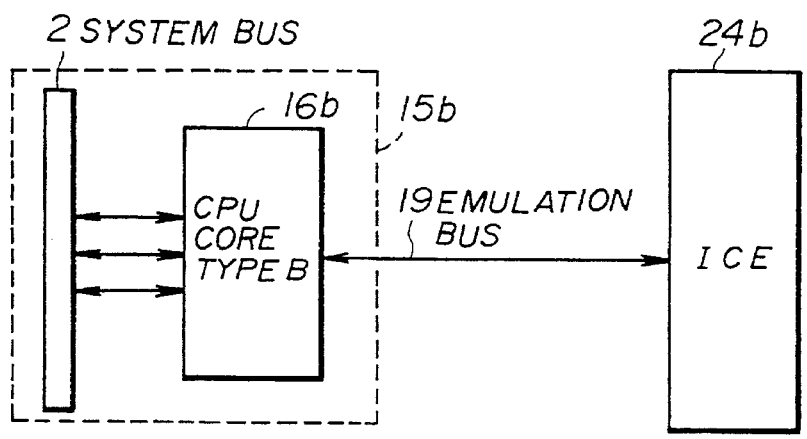
Figure 10C:
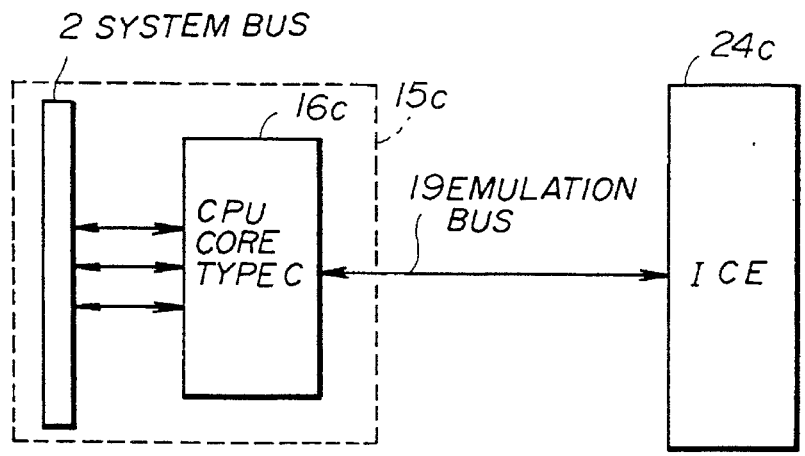

FIGS. 10A–10C show examples where emulation systems are implemented with CPU cores having different architectures and a common ICE. FIG. 29 shows respective specifications associated with the CPU cores of the three different architectures shown in FIGS. 10A–10C.

The above CPU cores are different in numbers of hardware interrupts, data bus widths, address bus widths, and so on. Thus, three different ICEs would have been developed corresponding to the three different CPU cores, in the related art. However, provision of emulator connecting-exclusive terminals 18 adaptable to the above emulation bus 19 in these CPU cores 16a–16c enables constructions as described below in a case where the CPU cores 16a–16c respectively constitute emulation systems as shown in FIGS. 10A–10C. The common ICE can be used as any of the ICE 24a connected to the CPU core 16a; the ICE 24b connected to the CPU core 16b; and the ICE 24c connected to the CPU core 16c. This indicates advantages resulting from construction of the present invention with respect to both cost-reduction and time-reduction factors. This is because it is not necessary to develop a different ICE for any CPU core having the above-described standardized emulator connecting-exclusive terminal 18.

Further, other implementations of emulation systems may be contrived within the scope of the present invention as shown in FIGS. 11A–11C. In FIGS. 11A–11C, the respective emulation systems are formed using respective pods 26a–26c and pod cables 27 for the ICs 15a–15c. The same reference numerals are given to elements that are the same as those in FIGS. 10A–10C.

Figure 12:
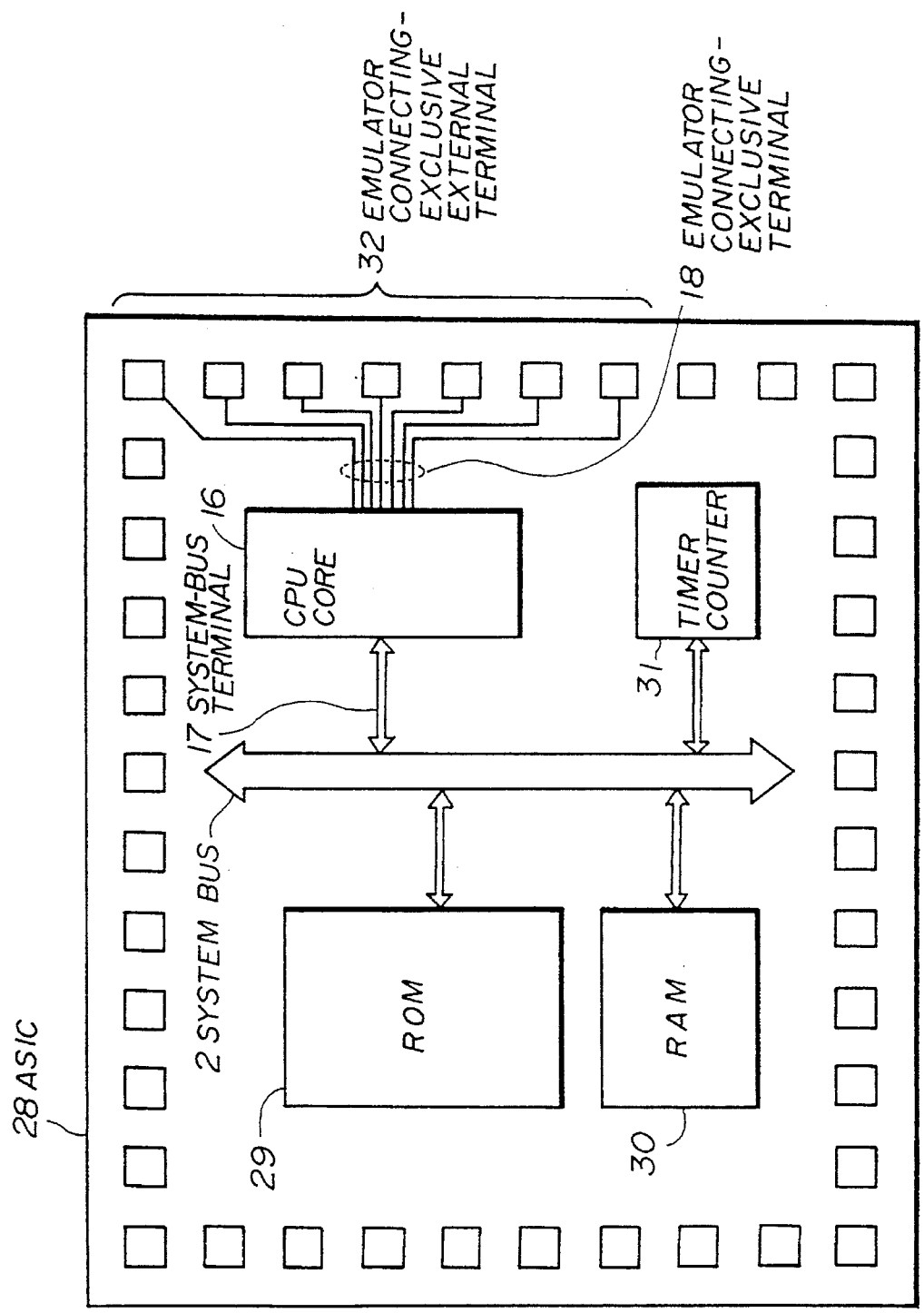
FIG. 12 shows a block diagram of an ASIC provided with a CPU core according to the present invention.

FIG. 12 shows an example of an ASIC using a CPU core 16 having the above emulator connecting-exclusive terminal 18.

The ASIC 28 shown in FIG. 12 is provided with ROM 29, RAM 30 and timer counter 31, in addition to the above CPU core 16. These respective devices are connected to the system bus 2. As described above, the CPU core 16 has, in addition to the system-bus terminal 17 connected to the system bus 2, the emulator connecting-exclusive terminal 18. The emulator connecting-exclusive terminal 18 is connected to the emulator connecting-exclusive external terminal 32 provided on the relevant ASIC 28. The chip having the above construction will not be manufactured as a special chip for the emulation system but will be formed as a production chip to be mounted on an end product for sale. As a result, the emulation system may be simply implemented for the above production chip as follows: The emulation bus 19 in the relevant emulation system is merely connected to the emulator connecting-exclusive external terminal 32 on the relevant ASIC 28.

Since emulation may thus be performed on the above production chip, the emulation may be performed even on the final product containing the chip, that is the ASIC 28 by the following procedure as follows: The emulation bus 19 in the relevant emulation system is merely connected to the emulator connecting-exclusive external terminal 32 on the ASIC 28.

Figure 13:
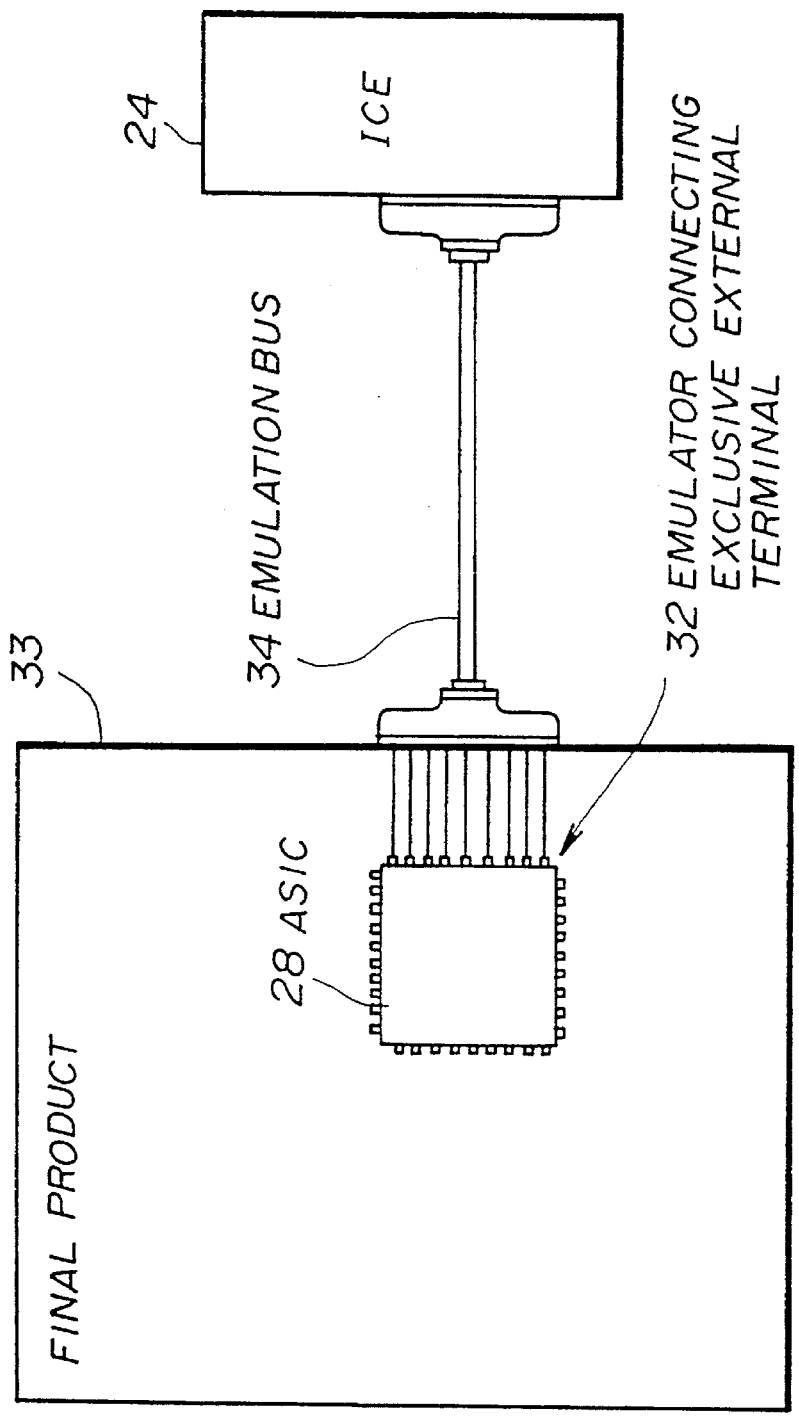
FIG. 13 shows a block diagram of a system in which an emulation operation is performed on a final product having the ASIC shown in FIG. 12.

FIG. 13 shows an example of a construction for performing the emulation operation on a final product on which the ASIC 28 is mounted.

The ASIC 28 in FIG. 13 is the ASIC 28 in FIG. 12. The final product 33 comprises a system provided with the ASIC 28. The emulator connecting-exclusive external terminal 32 is connected to the emulator element (ICE) 24 via the emulation bus 33. This construction enables the emulation operation to be performed on the final product 33 on which the ASIC 28 is mounted.

The internal construction associated with the CPU core 16 executing the above functions and operation will be described.

Figure 15:
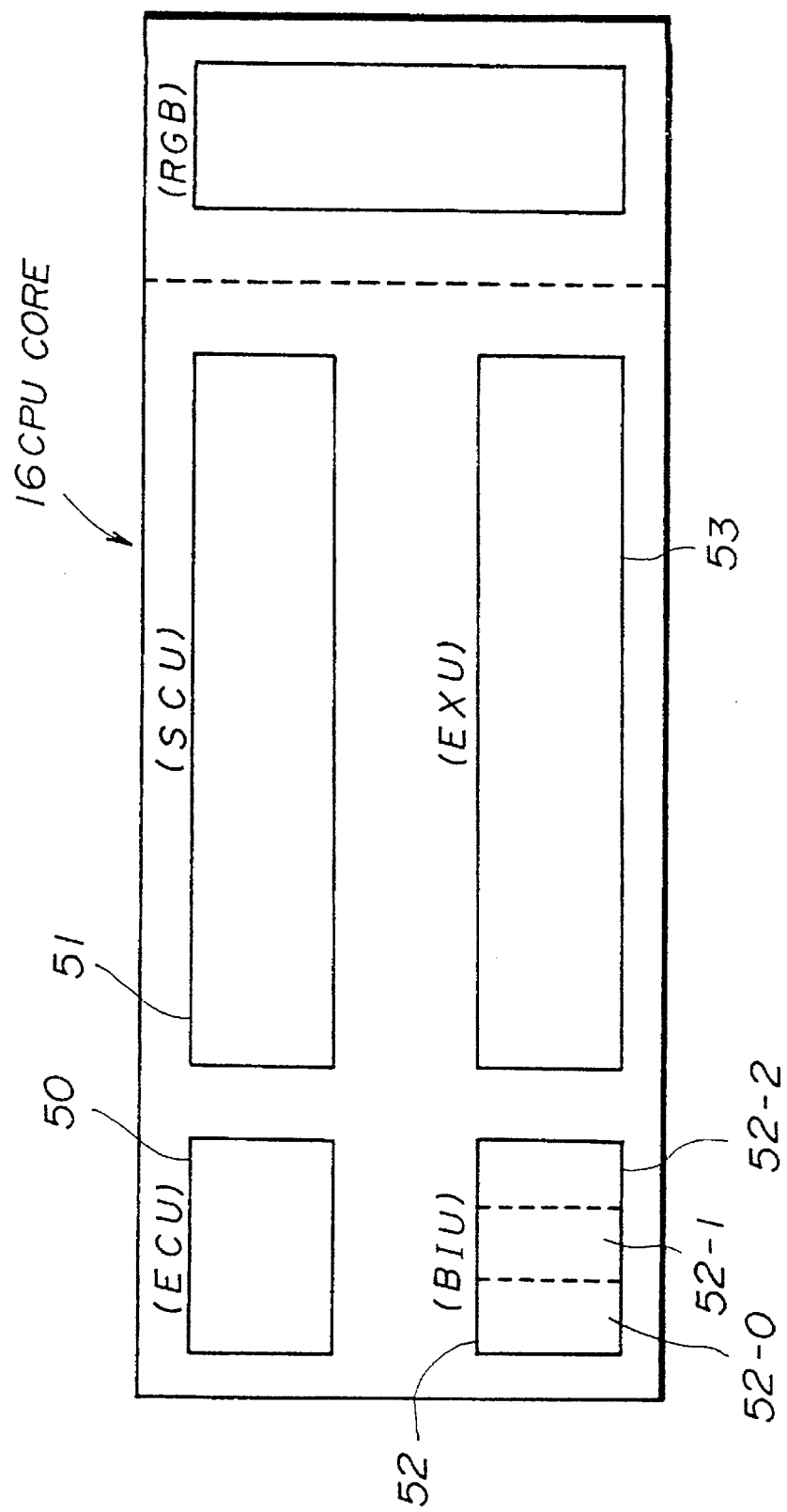
FIG. 15 a block diagram illustrating elements included in a CPU core according to the present invention.

As shown in FIG. 15, the CPU core 16 has four blocks, ECU (exception control unit) 50, SCU (sequence control unit) 51, BIU (bus interface unit) 52, and EXU (execution unit) 53. The BIU 52 executes control such as described above of the system bus 2 and emulation bus 19.

Figure 16:
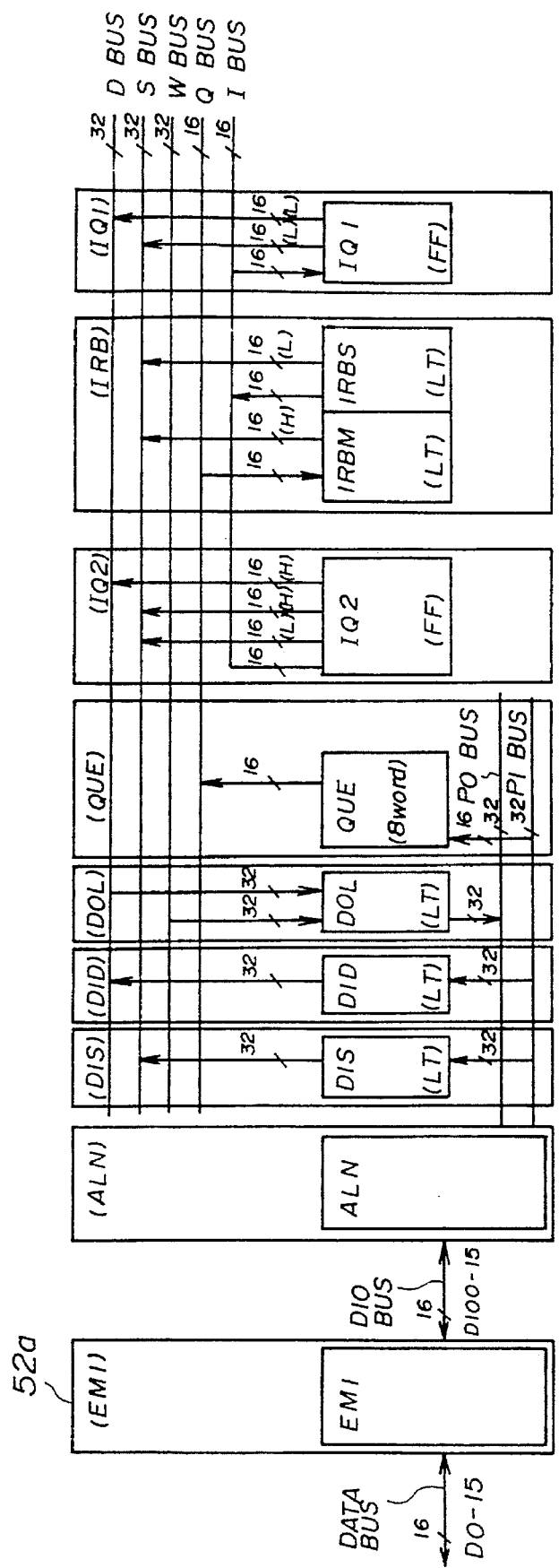
FIG. 16 shows a block diagram illustrating elements in a part of a BIU in FIG. 15.

The BIU 52 consists of BIU 52-0, BIU 52-1 and BIU 52-2. Each of the BIU 52-0 and BIU 52-1 has a construction as shown in FIG. 16. An EMI unit 52a performs control of data transmission via all the above-described terminal elements. Data multiplexed and then sent out via the respective terminal elements is sent to other components of the BIU 52 via an internal bus provided in the CPU core 16.

The components other than the EMI 52a shown in FIG. 16 will be generally described. An ALN is an aligner and aligns byte boundaries in data transferred through the data bus for each of the data types: bytes, words, and long words.

A DIS is a source data input latch and is a register for storing, in the CPU core 16, the source data in the memory to be processed by the CPU core 16.

A DID is a destination data input latch and is a register for storing, in the CPU core 16, the destination data in the memory to be processed by the CPU core 16.

A DOL is a data output latch and is a register for temporarily storing data that is to be written in the memory, which data has been processed by the CPU core 16.

A QUE is a pre-fetch queue and comprises a register for storing program instructions which should be executed subsequently or later by the CPU core 16 in a machine cycle of operation which does not require any external bus access during data processing. IQ 1, 2 comprise registers for storing therein data which has been transferred after the relevant data has been specified in a program as immediate data (The immediate data is coded into the machine-language word in the CPU. Such processing is addressing processing in the CPU referred to as immediate addressing.)

IRBM/S are instruction buffers and comprise registers with the purpose of solving problems concerning the instruction-code progress condition in pipeline processing inside the CPU core 16.

Figure 17:
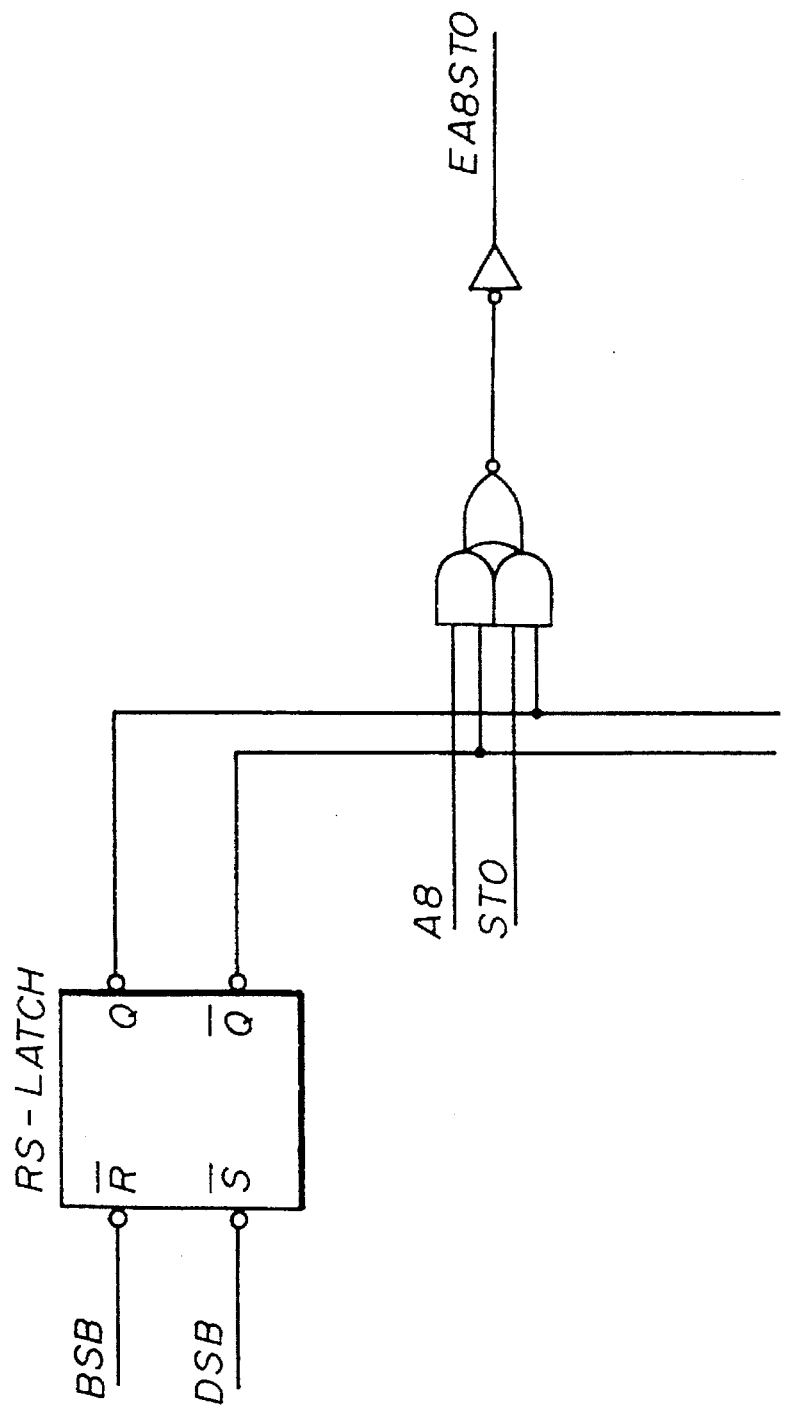
FIG. 17 shows a circuit diagram illustrating a circuit equivalent to a multiplexer circuit provided in an EMI of FIG. 16.

A circuit which is included in the EMI unit 52a and performs multiplexing of data to be sent to the respective terminal elements is formed of an equivalent circuit as shown in FIG. 17. That is, the multiplexing circuit consists of RS latch and a logic circuit. The above BSB or EBSB signal comprising the bus-cycle start signal and DSB or EDSB signal comprising the data strobe signal are input to the above RS latch as a reset reversing signal and set reversing signal. The above logic circuit is connected to the output side of the above RS latch and two signals to be multiplexed are input to the logic circuit. The multiplexing circuit selects one from between, for example, the A8 (8th bit in address data) and ST0 signals supplied to the above logic circuit. The above selection is performed based on the above BSB or EBSB signal and DSB or EDSB signal supplied to the RS latch. This selection operation is shown as an operation flow chart of FIG. 18.

Figure 18:
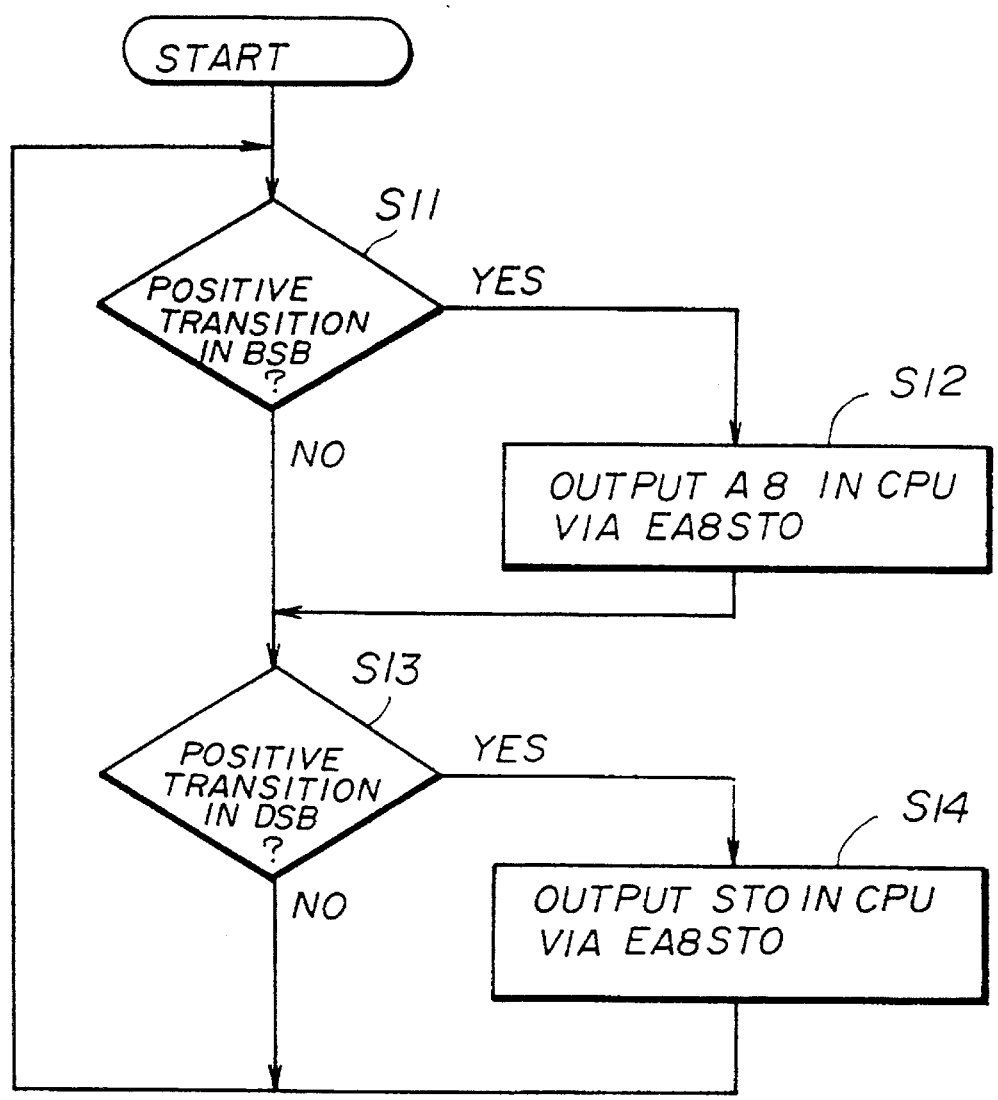
FIG. 18 shows an operation flow chart of operation in a multiplexer circuit shown in FIG. 17.

As shown in FIG. 18, the above multiplexing circuit first determines whether or not the BSB signal has undergone a positive transition in S11. If it has, the above supplied A8 data is output via the terminal element EA8ST0 in S12. If there has not been a positive transition in BSB (NO in S11), it is determined in S13 whether or not the DSB signal has undergone a positive transition. If it has (YES in S13), the above ST0 signal is output via the terminal element EA8ST0. If it has not (NO in S13), the current operation returns to the initial condition.

As described above, by using the CPU core of the embodiment according to the present invention, provision of the emulation chip required in the related art may be eliminated. This elimination may be made due to use of the standardized emulation bus. Further, by standardizing the emulation bus, a common emulation bus may be connected to any of a plurality of CPU cores having different specifications, that is, different architectures by simply providing the standardized emulator connecting-exclusive terminal on the relevant CPU core. Thus, a common emulator may be used for performing the emulation operation on any of the plurality of different-specification CPU cores.

Further, forming CPU cores so as to respectively have different architectures but having common-standard emulation buses may eliminate the necessity of changing emulator hardware corresponding to the respective CPU cores. Thus, respective emulators but having exactly the same hardware constructions may be used for the respective CPU cores.

Further, as described above, connecting the CPU core provided in the IC to the emulator via the emulation bus may eliminate provision of the bus switch in the IC as shown in FIG. 2. Further, since the system-bus terminal on the CPU core is not used in the performance of emulation, it can be ensured that necessary operation times and AC characteristics in the system side are completely the same in the emulation operation mode as in the normal operation mode. Thus, stable emulation operation can be ensured. (The AC characteristics mean a rule concerning signal transfer timing procedure in accordance of which various signals are input to the CPU or output from the CPU.)

Further, producing of a special evaluation chip is not necessary for implementing the emulation system in an ASIC on which a CPU core, connectable to a standardized emulation bus such as described above, is mounted. Thus, a chip to be mounted on a product constitutes the emulation system within it. Further, the emulation operation is carried out in a final product comprising a system in which the above ASIC chip mounted on a product is used. This is achieved by simply connecting the emulation bus in the ASIC to the emulator element.

Further, the provision of the emulation-bus use non-permission terminal element (EMEN terminal element) on the CPU core enables implementation of a convenient function as described below. The state where the emulator element is not connected via the emulation bus to the CPU core causes a certain signal to be provided to the EMEN terminal element comprising only one terminal element. The above signal indicates that the emulation bus will not be used. By this procedure, because no other special setting on the other terminal elements in the emulation bus is necessary, setting the normal operation state on the CPU core is a simple task. Thus, the CPU core may operate in the normal operation mode without paying any attention to the terminal elements in the emulation bus.

Further, by providing the EPDM0 and ELVM1 terminal elements, selection of the bus to be used in the performing of emulation operation may be controlled by simply setting signals to be supplied to these terminal elements. No other special circuits need to be provided externally to the CPU core.

Further, in the monitor mode, selection of the bus to be used in program execution, data read, and data write operation may be made by simply setting of signals to be provided to the mode terminal elements, that is, the above EPDM0 terminal element and EVLM1 terminal element. Thus, data in the system side may be simply read/written during execution of the monitor program.

Further, hardware interrupts exclusive to the emulator are capable of being performed. Also, software interrupts can be performed. Thus, since interrupts in the system side are not affected and the vector number is set as a particular value in the CPU core in the embodiment in the NMI operation, the emulator is not required to determine at the time of vector fetching whether the interrupt is from the emulator side or the system side.

Further, by the provision of the EBK0 terminal element and EBK1 terminal element, selection from among reset by the emulator, emulator NMI1, emulator NMI2 and software interrupt processing may be made by appropriately setting signals input to the above terminal elements. Thus, the above processing may be controlled independently of the bus in the system side.

Further, since the auto-vector method is always used for both the emulator NMI1 and emulator NMI2, the vector addresses for the emulator NMI1 and emulator NMI2 are respectively generated and the particular vector addresses are respectively generated independently of the value stored in the exception vector base register (EVBR). Thus, without being affected either by the setting of CPU-core internal states by the system side or by system-bus states, a fixed operation sequence for the emulator NMI can be performed. Thus, interruption through the emulator may be easily performed.

Further, since, in the emulator NMI2, the relevant interrupt occurs only if the bus cycle immediately before the current cycle has been performed in the CPU core, the relevant break operation may be performed in the bus cycle of the performed operation without being affected by a pre-fetch due to an instruction pre-fetch function in the CPU core.

Further, even in the case of an emulation break, the particular vector address is generated as a result of the emulation-break instruction being provided, independently from the value stored in the above EVBR. The identical emulation-break sequence is always executed without being affected by the CPU-core internal states.

Further, by providing the respective EAD8–15 terminal elements, address and data may be traced by the emulator element in the normal operation mode. In the monitor mode, the emulator provides the relevant program data to the CPU and thus the CPU can execute the monitor program. Further, when the software break is used, the relevant data is forcibly input via the JAM terminal element at the break address fetch time. Then, the emulation break instruction code is given to the CPU core via this terminal element. Thus, the emulation break can be performed.

Further, the number of terminal elements may be reduced by sending the relevant address and data via one terminal element after multiplexing them.

By providing the respective EA8ST0, EA8ST1, and EA10ST2 terminal elements, the bus statuses shown in FIG. 23 may be included in the emulator tracing data. As a result, trace data may be easily analyzed. Further, since the address and the status signal indicating the CPU core 16 state are multiplexed, one terminal element is sufficient for the two types of information. Thus, the number of terminal elements may be reduced.

The above trace data is data to be used for analyzing, by the operator of the relevant emulator element, the relevant execution history in the CPU core after the CPU core operates. The emulator element (ICE) is provided with the function of recording about 1000–10000 bus cycles of CPU core operation. The analyzing of the trace data becomes easier in proportion to the amount of bus status information which constitutes the relevant trace data. The trace data normally comprises addresses, data, RWB, bus status and so on.

Further, by providing the EA11EM terminal element, it can be determined whether the CPU core accesses the system-bus side or the emulator-bus side. Further, the number of terminal elements may be reduced by sending the relevant address and data indicating the emulation mode via one terminal element after multiplexing them.

By providing the EA12DA terminal element, a procedure described below can be implemented. In a case where data is transferred from the emulation-bus side, the CPU core is made to wait appropriately so that the CPU can access a device slowly. Such a measure may be taken so as to match the CPU access capability with the capability in the relevant device to be accessed if the relevant device does not have a sufficient capability of being accessed by the CPU in the original CPU access rate. Further, the number of terminal elements may be reduced by multiplexing on one terminal element of sending of the relevant address with inputting of data acknowledge.

Further, by providing the EA13DD terminal element, a function described below can be implemented. Wasteful wait cycles of operation may be eliminated, such as halt in the CPU core due to data acknowledge by the system-bus side during control of the CPU core by the emulation-bus side. Further, the number of terminal elements may be reduced by multiplexing on one terminal element of sending of the relevant address with inputting of the data-acknowledge preventing signal.

Further, by providing the EA14JM terminal element, data may be forcibly input from the emulation bus even when the system bus is selected. Thus, for example, an emulation break instruction may be forcibly input during a software break even when the system bus is used. Further, the number of terminal elements may be reduced by multiplexing on one terminal element of sending the relevant address with inputting of the JAM signal.

Further, by providing the EA15DI terminal element, a function described below may be executed. In a case, for example, where the monitor program is operated so as to monitor the CPU through the emulator, interrupt requested by the system side may be prevented. Further, the number of terminal elements may be reduced by multiplexing on one terminal element of sending the relevant address with inputting of the interrupt preventing signal.

Further, by providing the ERWB terminal element, it can be determined whether the system-bus side in the CPU core is in a read state or in a write state. Thus, in the use of the emulation bus, data transfer direction can be determined accordingly.

Further, by providing the ESIZE terminal element, the data size which the CPU core will access can be determined. Further, a certain device among the peripheral devices in the system side may receive information, from the CPU core, concerning the data size in which the CPU core will use. Then, the relevant device sends a size acknowledge signal, as the answer to the received information, which signal indicates the data size in which the CPU core can access. By providing the ESIZE terminal element, the size acknowledge signal contents can be recognized. Further, the number of terminal elements may be reduced by multiplexing on one terminal element of the transfer data size signal with the size acknowledge signal.

Further, by providing the EBSB terminal element, the emulator side can recognize, in the normal operation mode, that the CPU core starts accessing of the bus at the system side. In the monitor mode, the emulator side can recognize that access of the emulation bus has started.

Further, by providing the EDSB terminal element, the emulation side can recognize, in the normal state, that the valid data in the data bus at the system-bus side is output from the CPU core to the data bus in the emulation bus. In the monitor mode, the emulator can recognize, in a read cycle, that a peripheral device associated with the emulation bus drives the relevant data bus and, in a write cycle, that valid data in the CPU core exists on the data bus in the emulation bus.

Further, by providing the ECLKO terminal element, the emulation-bus side can recognize as to whether or not a clock is provided in the CPU core.

Further, by providing the ERESO terminal element, the emulation-bus side can recognize as to whether or not resetting is performed on the CPU core by the system-bus side.

Further, by providing the EBAB terminal element, the emulator side can recognize that the CPU core is in the DMA state. Further distinguishing of the DMA cycle can be made in the trace operation mode.

Further, there may occur problematic phenomena such as endless DMA operation in the system-bus side or endless bus-retry, due to a fault of some sort. In such cases, the CPU core cannot start execution of the subsequent program and thus the emulator cannot execute the monitor program. By providing the EDBRQ terminal element, the CPU core can be forcibly made to exit from such a problematic condition and then start execution of the subsequent process.

In summary, according to the present invention, a CPU core provided in an IC can be used even in the emulation mode. This is achieved as a result of using a standardized emulation bus which is capable of being connected to a plurality of different-specification CPU cores. Thus, the necessity of manufacturing of an emulation chip as in the related art can be eliminated. Further, by standardizing the emulation bus, simply providing the standardized emulator connecting-exclusive terminal on the CPU core enables use of an identical emulation bus to be connected to a plurality of different-specification CPU cores. If a specification of a CPU core is changed, the same emulation means can be used for performing the emulation operation.

Further, there is no necessity to change the hardware of emulation means for respective CPU cores having different specifications and thus the relevant emulation means can comprise completely identical hardware. This is achieved by making the respective CPU cores connectable to an identical-standard emulation bus.

Further, the present invention is not limited to the above described embodiments, and variations and modifications may be made without departing from the scope of the present invention.

What is claimed is:

1. An emulation system comprising:

an integrated circuit (IC) provided with a central processing unit (CPU) core arbitrarily selected from a plurality of CPU cores, each of said CPU cores having system-bus terminals, a system bus and a plurality of common emulator connecting-exclusive terminals, said IC being also connected to a predetermined device via said system bus associated with the selected CPU core;

an emulation bus connectable to said common emulator connecting-exclusive terminals of said selected CPU core; and an emulator for performing emulation of said selected CPU core connected to said emulation bus when said selected CPU core is selectively in a monitor mode.

2. An emulation system according to claim 1, wherein a number of said common emulator connecting-exclusive terminals and a corresponding function associated with each of said common emulator connecting-exclusive terminals are identical among said plurality of said CPU cores.

3. The emulation system according to claim 2, wherein said selected CPU core further comprises an emulation-bus use permission input terminal in addition to the common emulator connecting-exclusive terminals, said emulation-bus use permission input terminal being used for supplying therethrough a signal controlling whether or not said selected CPU core operates in the monitor mode via the common emulator connecting-exclusive terminal.

4. The emulation system according to claim 2, wherein said selected CPU core is provided with at least one monitor-mode setting signal input terminal for supplying therethrough a signal which sets one of a plurality of bus-control modes for controlling whether the system-bus terminal or the common emulator connecting-exclusive terminal provided on the selected CPU core is selected to be given a bus control right concerning said selected CPU core.

5. The emulation system according to claim 4, wherein said plurality of bus-control modes comprises:

a normal mode wherein said emulator breaks, resets, and forcibly inserts read data, and a bus acknowledge operation is controlled via the common emulator connecting-exclusive terminal with respect to the predetermined device, the bus control concerning said selected CPU core being performed via the system-bus terminal, and addresses and data input via said system-bus terminal being sent out via said common emulator connecting-exclusive terminals;

a monitor 1 mode wherein the bus control concerning said selected CPU core is performed by using the common emulator connecting-exclusive terminal;

a monitor 2 mode wherein the bus control concerning said selected CPU core is performed by using the common emulator connecting-exclusive terminal as well as the system-bus terminal for reading data; and a monitor 3 mode wherein the bus control concerning said selected CPU core is performed by using the common emulator connecting-exclusive terminal as well as the system-bus terminal for writing data.

6. The emulation system according to claim 2, wherein, in the monitor mode when said selected CPU core is in a state where the predetermined device is to operate, said selected CPU core is in a state for receiving a hardware interrupt request and a software interrupt request, each request acting as an interrupt request from said emulator to said selected CPU core.

7. The emulation system according to claim 6, wherein the common emulator connecting-exclusive terminals include an interrupt processing input terminal for supplying therethrough a signal selectively specifying:

a reset operation substantially identical to a normal reset sequence performed by said predetermined device connected to the system-bus terminal in said selected CPU core;

an emulator NMI1 operation comprising a sequence substantially identical to a non-maskable interrupt sequence by said predetermined device, said operation resulting in generation of a unique vector number and unique vector address values that are distinct from those generated in the non-maskable interrupt sequence by said predetermined device, and said emulation NMI1 operation resulting in generation of a unique vector address without an offset value being added to said unique address values; and an emulator NMI2 operation comprising a sequence substantially identical to the non-maskable interrupt sequence, said emulator NMI2 operation performing the interrupt processing in the selected CPU core only if a bus cycle is being carried out in said selected CPU core, said bus cycle being the one in which the relevant interrupt request occurred, and said operation resulting in generation of a unique vector number and unique vector address values that are distinct from those generated in the non-maskable interrupt sequence by said predetermined device, and said operation resulting in generation of the unique vector address without an offset value being added to said unique values.

8. The emulation system according to claim 7, wherein said interrupt processing input terminal further comprises two terminal elements for selecting one of said reset operation, said emulator NMI1 operation, said emulator NMI2 operation, and a normal mode in the absence of said reset operation, said emulator NMI1 operation and said emulator NMI2 operation.

9. The emulation system according to claim 6, wherein said software interrupt request gives rise to a sequence substantially identical to a break instruction sequence in the selected CPU core, said software interrupt request including an emulator break instruction specifying a generation of a unique vector number and unique vector address values distinct from those generated in the break instruction sequence, said emulator break instruction specifying generation of the vector address without adding an offset value to said unique vector address values.

10. The emulation system according to claim 7, wherein, in said emulator NMI1 and NMI2 operations, an automatic vector generation scheme is used and the unique vector address value is outputted.

11. The emulation system according to claim 2, wherein said common emulator connecting-exclusive terminals include an address/data terminal such that, as a result of multiplexing, an address is sent out via said address/data terminal in the first half of one bus cycle; and data is sent out, after being multiplexed, via said address/data terminal in the second half of said bus cycle;

said address/data terminal, in a normal mode when said selected CPU core is not in the monitor mode, outputting independently from the read/write conditions in the selected CPU core except in the case where the emulator forcibly sends data to said selected CPU core, said address/data terminal being used for sending out therethrough data input to the system-bus terminal.

12. The emulation system according to claim 2, wherein said common emulator connecting-exclusive terminals include an address/status terminal for sending out therethrough, as a result of multiplexing, bit address data in the first half of one bus cycle and in the second half of said bus cycle, a status signal indicating a bus state associated with the operation currently performed by the selected CPU core.

13. The emulation system according to claim 2, wherein said common emulator connecting-exclusive terminals include an address/emulation-mode terminal used for sending out therethrough, as a result of multiplexing, bit address data in the first half of one bus cycle and in the second half of said bus cycle, an emulation-mode signal indicating that either the predetermined device or the emulator is currently used in said bus cycle, both being connected to the system-bus terminal.

14. The emulation system according to claim 2, wherein said common emulator connecting-exclusive terminals include an address/data-acknowledge terminal for sending out therethrough, as a result of multiplexing, bit address data in the first half of one bus cycle and in the second half of said bus cycle, a data acknowledge signal indicating that data transfer from the emulation bus to the selected CPU core has finished.

15. The emulation system according to claim 2, wherein said common emulator connecting-exclusive terminals include an address/data-acknowledge invalidating terminal for sending out therethrough, as a result of multiplexing, bit address data in the first half of one bus cycle and in the second half of said bus cycle, a data-acknowledge invalidating signal indicating that a data acknowledge signal sent from the system bus to the selected CPU core is invalid.

16. The emulation system according to claim 2, wherein said common emulator connecting-exclusive terminals include an address/jam terminal used for sending out therethrough, as a result of multiplexing, bit address data in the first half of one bus cycle and in the second half of said bus cycle, a jam signal indicating a forcible data input.

17. The emulation system according to claim 2, wherein said common emulator connecting-exclusive terminals include an address/interrupt preventing terminal for sending out therethrough, as a result of multiplexing, bit address data in the first half of one bus cycle and in the second half of said bus cycle an interrupt preventing signal indicating a prevention of an interrupt.

18. The emulation system according to claim 2, wherein said common emulator connecting-exclusive terminals include a read/write terminal for sending out therethrough a signal indicating the data transfer direction in the system bus as well as in the emulation bus.

19. The emulation system according to claim 2, wherein said common emulator connecting-exclusive terminals include a transfer data size/size acknowledge terminal for sending out therethrough, as a result of multiplexing, information concerning transferred data in the first half of one bus cycle and in the second half of said bus cycle, a size acknowledge signal indicating a port size sampled in said bus cycle in the predetermined function means connected to the system bus.

20. The emulation system according to claim 2, wherein said common emulator connecting-exclusive terminals include a bus-cycle start terminal for sending out therethrough a signal indicating a start of a bus cycle in synchronization with another bus cycle in the predetermined device connected to the system bus.

21. The emulation system according to claim 2, wherein said common emulator connecting-exclusive terminals include a data strobe terminal for sending out therethrough a signal indicating in a read cycle when the predetermined device connected to the system bus should drive said system data bus and in a write cycle when the selected CPU core is sending valid data.

22. The emulation system according to claim 2, wherein said common emulator connecting-exclusive terminals include a clock output terminal for sending out therethrough a clock signal which is supplied to the predetermined device connected to the system bus.

23. The emulation system according to claim 2, wherein said common emulator connecting-exclusive terminals include a reset output terminal for sending out therethrough a reset signal which is supplied to the predetermined device connected to the system bus.

24. The emulation system according to claim 2, wherein said common emulator connecting-exclusive terminals include a bus acknowledge terminal for sending out therethrough a bus acknowledge signal indicating that the predetermined device connected to the system bus associated with the selected CPU core performs a direct memory access operation, said bus acknowledge signal indicating a state when said selected CPU core surrenders the bus control right to said predetermined device.

25. The emulation system according to claim 2, wherein the common emulator connecting-exclusive terminals include a program/data/monitor mode terminal for sending out therethrough, as a result of multiplexing, a signal indicating, in the first half of one bus cycle, which of a program area and data area in an address space is accessed by the selected CPU core, said signal, in the second half of said bus cycle, controlling whether the selected CPU core is in the monitor mode.

26. The emulation system according to claim 2, wherein said common emulator connecting-exclusive terminals include a level/monitor mode terminal for, as a result of multiplexing, in the first half of one bus cycle, outputting a privilege level of the selected CPU core, and sending another signal, in the second half of said bus cycle, which controls whether the selected CPU core is in the monitor mode.

27. The emulation system according to claim 2, wherein said common emulator connecting-exclusive terminals include a bus-request preventing terminal for sending out therethrough a signal for preventing both a bus control right surrendering function and a bus retry function of the selected CPU core.

28. The emulation system according to claim 2, wherein the number of terminal elements provided in said common emulator connecting-exclusive terminals is smaller than a number of terminal elements provided in the system-bus terminal.

29. An application-specific IC comprising:
   a CPU core arbitrarily selected from a plurality of CPU cores, each of said CPU cores having system-bus terminals and common emulator connecting-exclusive terminals, said common emulator connecting-exclusive terminals being identical in a number of terminal elements thereof and in function associated with each terminal element thereof among said plurality of said CPU cores; and
   an emulator connecting-exclusive external terminal directly connected to said common emulator connecting-exclusive terminals, said emulator connecting-exclusive external terminals being provided as external terminals associated with said application-specific IC.

30. The application-specific IC according to claim 29 said external terminals include an emulation-bus use permission input terminal in addition to said common emulator connecting-exclusive terminals, said emulation-bus use permission input terminal being used for supplying therethrough a signal controlling whether or not the selected CPU core operates in a monitor mode via the common emulator connecting-exclusive terminals.

31. The application-specific IC according to claim 29, wherein said external terminals include at least one monitor-mode setting signal input terminal for supplying therethrough a signal setting a plurality of bus-control modes controlling whether the system-bus terminals or the common emulator connecting-exclusive terminals provided on the selected CPU core are selected to be given the bus control right concerning said selected CPU core.

32. A plurality of CPU cores, each of said CPU cores comprising:
   system-bus terminals; and
   common emulator connecting-exclusive terminals, said common emulator connecting-exclusive terminals being identical in a number of terminals thereof and functions associated with each terminal thereof among said CPU cores.

33. The plurality of different-specification CPU cores according to claim 32, further comprising an emulation-bus use permission input terminal, said emulation-bus use permission input terminal being used for supplying therethrough a signal controlling whether or not a monitor mode is operated via the common emulator connecting-exclusive terminal.

34. The plurality of different-specification CPU cores according to claim 32 further comprising at least one monitor-mode setting signal input terminal provided as an external terminal for supplying therethrough a signal which sets a plurality of predetermined bus-control modes for controlling whether the system-bus terminals or the common emulator connecting-exclusive terminals provided on the selected CPU core are selected to be given the bus control right concerning said selected CPU core.

\* \* \* \* \*

UNITED STATES PATENT AND TRADEMARK OFFICE
CERTIFICATE OF CORRECTION

PATENT NO. : 5,594,890
DATED : January 14, 1997
INVENTOR(S) : Shinichi Yamaura, Keiichi Yoshioka, Kazuhiko Hara and Takao Katayama It is certified that error appears in the above-indentified patent and that said Letters Patent is hereby corrected as shown below:

Column 7, line 19, change "Transfer" to --(Transfer--.
(1st occurrence)
Column 11, line 40, change "toheter" to --together--.

Signed and Sealed this

Thirteenth Day of May, 1997

Attest:

BRUCE LEHMAN

Attesting Officer

Commissioner of Patents and Trademarks